(12) United States Patent
Shirahashi et al.

(10) Patent No.: US 10,837,397 B2
(45) Date of Patent: *Nov. 17, 2020

(54) FUEL INJECTION CONTROL SYSTEM AND FUEL INJECTION CONTROL METHOD FOR DIESEL ENGINE

(71) Applicant: Mazda Motor Corporation, Hiroshima (JP)

(72) Inventors: Naotoshi Shirahashi, Hiroshima (JP); Tunehiro Mori, Aki-gun (JP); Kiyoaki Iwata, Hiroshima (JP); Takeshi Matsubara, Hiroshima (JP); Sangkyu Kim, Higashihiroshima (JP)

(73) Assignee: Mazda Motor Corporation, Hiroshima (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/443,731

(22) Filed: Jun. 17, 2019

(65) Prior Publication Data

US 2020/0003146 A1    Jan. 2, 2020

(30) Foreign Application Priority Data

Jun. 28, 2018  (JP) .................................. 2018-122989

(51) Int. Cl.
*F02D 41/40*     (2006.01)
*F02D 41/00*     (2006.01)
(Continued)

(52) U.S. Cl.
CPC ....... *F02D 41/403* (2013.01); *F02D 41/0042* (2013.01); *F02D 41/0065* (2013.01); *F02D 41/32* (2013.01); *F02F 3/28* (2013.01)

(58) Field of Classification Search
CPC ............... F02D 41/403; F02D 41/0042; F02D 41/0065; F02D 41/32; F02D 41/405;
(Continued)

(56) References Cited

U.S. PATENT DOCUMENTS 8,156,927 B2    4/2012   Iikubo et al.
10,066,545 B2 *  9/2018   Klyza ................... F02D 41/403
(Continued)

FOREIGN PATENT DOCUMENTS

DE    102005055367 A1   6/2006
EP         2163755 A2   3/2010
(Continued)

OTHER PUBLICATIONS

European Patent Office, Extended European Search Report Issued in Application No. 19180157.0, dated Oct. 30, 2019, Germany, 11 pages.

*Primary Examiner* — Hai H Huynh
(74) *Attorney, Agent, or Firm* — Alleman Hall Creasman & Tuttle LLP

(57) ABSTRACT

A fuel injection control causes a fuel injection valve to execute at least: a main injection to inject fuel at timing when a piston is positioned near a compression top dead center; a pilot injection to inject the fuel at timing earlier than the main injection; and a low penetration injection to inject the fuel at timing earlier than the pilot injection or timing later than the main injection. The fuel injection control device includes: a first injection control module that executes at least one of the main injection or the pilot injection at timing to inject the fuel toward a joint portion of a cavity; and a second injection control module that executes the low penetration injection to inject the fuel only into a radial central region of a combustion chamber.

11 Claims, 19 Drawing Sheets

(51) Int. Cl.
*F02D 41/32* (2006.01)
*F02F 3/28* (2006.01)

(58) Field of Classification Search
CPC ..... F02F 3/28; F02B 23/0693; F02B 23/0684;
F02B 23/0672; F02B 23/0651
USPC ........ 123/269, 276, 279, 298, 299, 300, 301
See application file for complete search history.

(56) References Cited

U.S. PATENT DOCUMENTS

| | | |
|---|---|---|
| 2009/0025675 A1 | 1/2009 | Ilkubo et al. |
| 2010/0065017 A1 | 3/2010 | Cho et al. |
| 2012/0000197 A1 | 1/2012 | Maruyama et al. |
| 2015/0192087 A1 | 7/2015 | Shirahashi et al. |
| 2015/0354519 A1 | 12/2015 | Shimo et al. |
| 2017/0159549 A1* | 6/2017 | Uehara ................... F02B 23/06 |
| 2020/0003147 A1* | 1/2020 | Shirahashi .......... F02B 23/0651 |

FOREIGN PATENT DOCUMENTS

| | | |
|---|---|---|
| FR | 2902462 A1 | 12/2007 |
| JP | 2004190573 A | 7/2004 |
| JP | 3984908 B2 | 10/2007 |
| JP | 4906055 B2 | 3/2012 |

\* cited by examiner

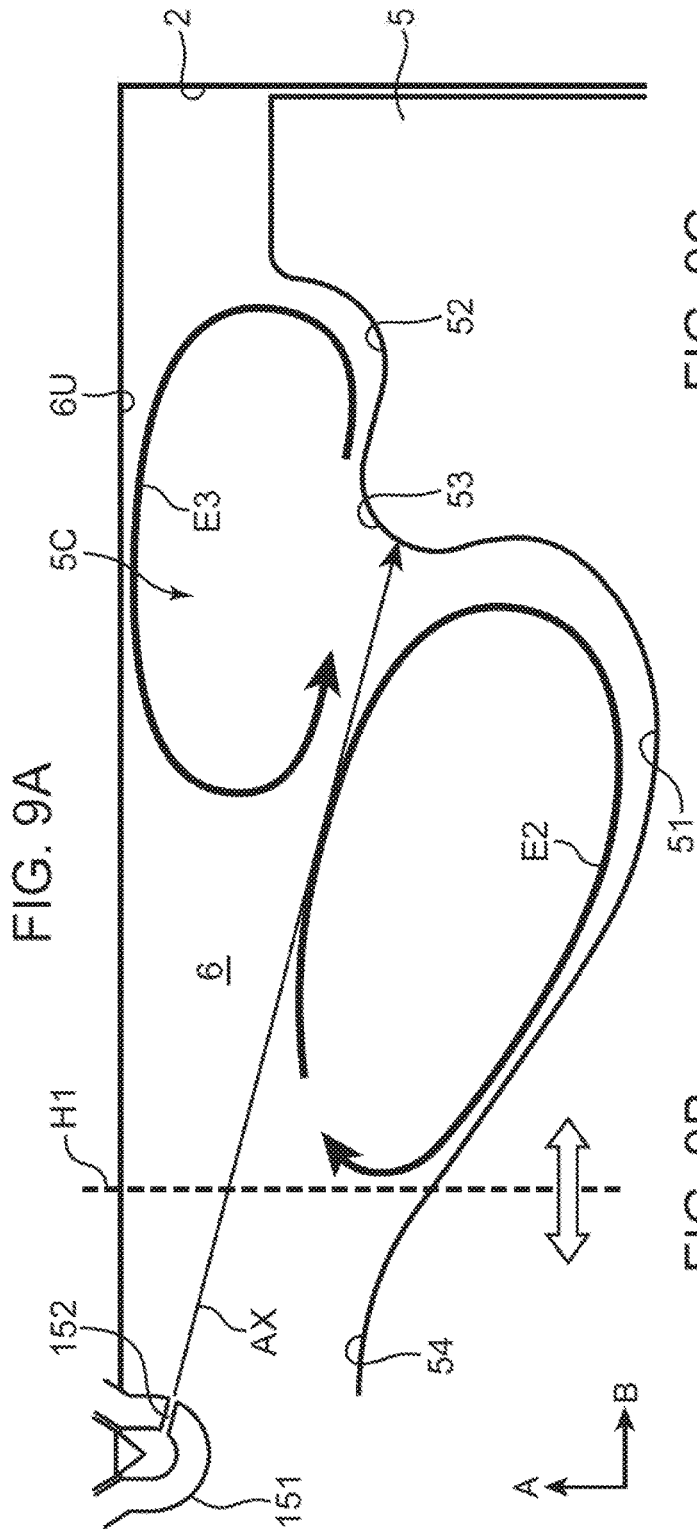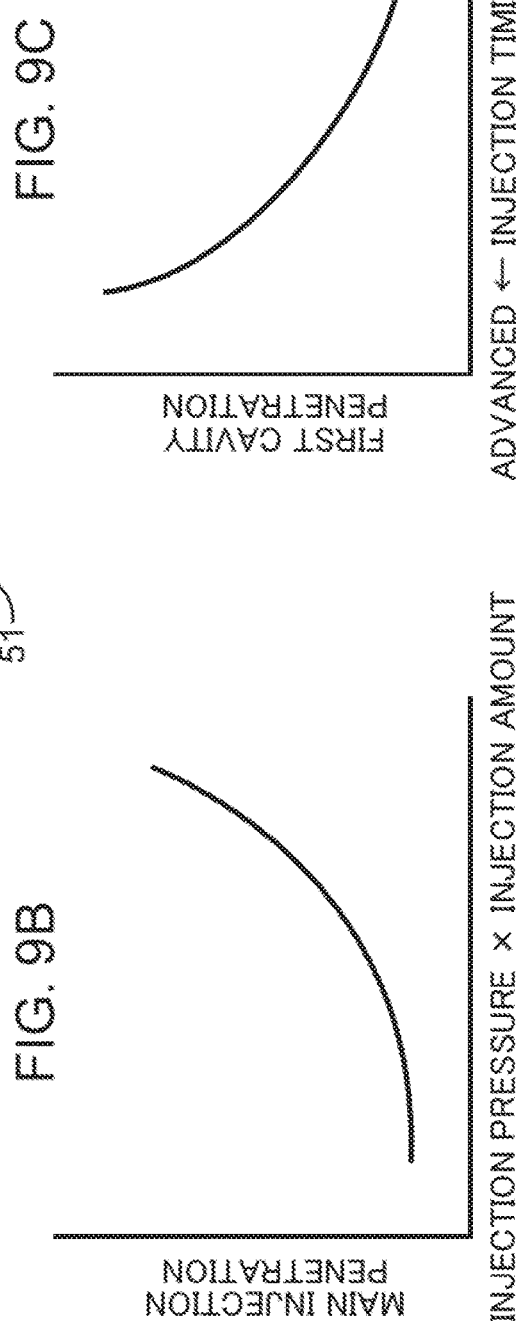

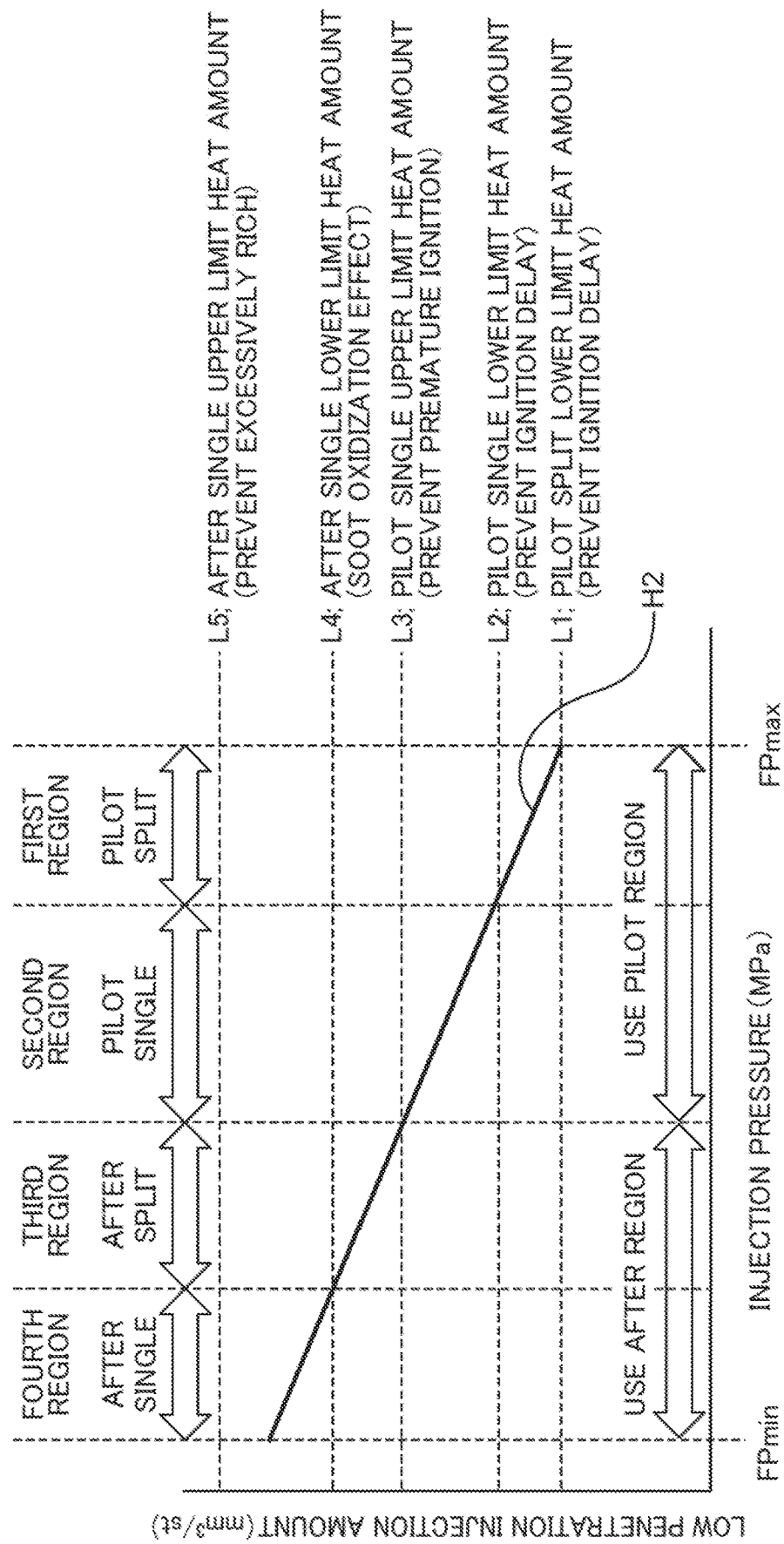

FIG. 13

<FACTORS AFFECTING IGNITION QUALITY>

| FACTOR | HIGH IGNITION QUALITY | LOW IGNITION QUALITY |
|---|---|---|
| OUTSIDE AIR TEMPERATURE | HIGH TEMPERATURE | LOW TEMPERATURE |
| AIR PRESSURE (ALTITUDE) | HIGH PRESSURE | LOW PRESSURE |
| ENGINE ROTATION SPEED | HIGH ROTATION | LOW ROTATION |
| ENGINE LOAD | HIGH LOAD | LOW LOAD |
| ENGINE WATER TEMPERATURE | HIGH TEMPERATURE | LOW TEMPERATURE |
| EGR AMOUNT | SMALL | LARGE |
| TURBO CHARGING PRESSURE | HIGH PRESSURE | LOW PRESSURE |

<FACTORS AFFECTING GENERATION OF SOOT>

| FACTOR | MODE | CAUSE |
|---|---|---|
| INJECTION PRESSURE | LOW PRESSURE | WHEN INJECTION PRESSURE DECREASES, SPRAY PARTICLE SIZE INCREASES AND SOOT IS MORE LIKELY TO BE GENERATED |
| OUTSIDE AIR TEMPERATURE | HIGH TEMPERATURE | SINCE IGNITION QUALITY IMPROVES, SOOT IS MORE LIKELY TO BE GENERATED |
| ENGINE ROTATION SPEED | HIGH ROTATION | SINCE IGNITION QUALITY IMPROVES, SOOT IS MORE LIKELY TO BE GENERATED |
| ENGINE LOAD | HIGH LOAD | SINCE IGNITION QUALITY IMPROVES, SOOT IS MORE LIKELY TO BE GENERATED |
| ENGINE WATER TEMPERATURE | HIGH TEMPERATURE | SINCE IGNITION QUALITY IMPROVES, SOOT IS MORE LIKELY TO BE GENERATED |
| EXHAUST OXYGEN AMOUNT | LARGE | SINCE THERE IS PLENTY OF OXYGEN, SOOT DECREASES |

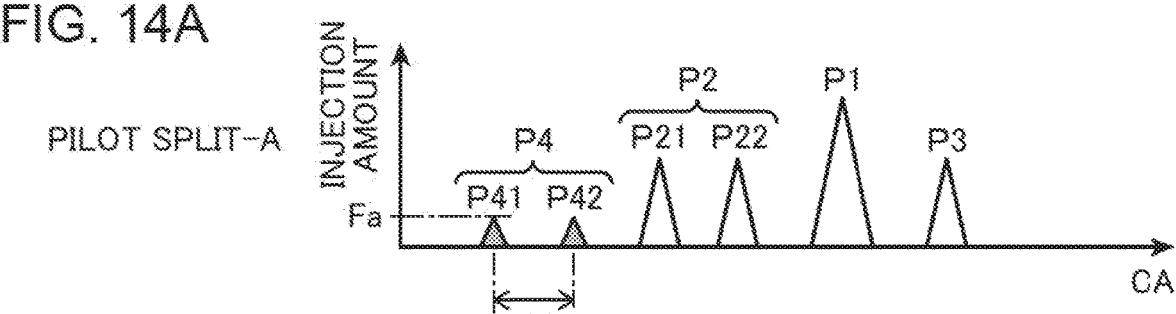
FIG. 14A PILOT SPLIT-A
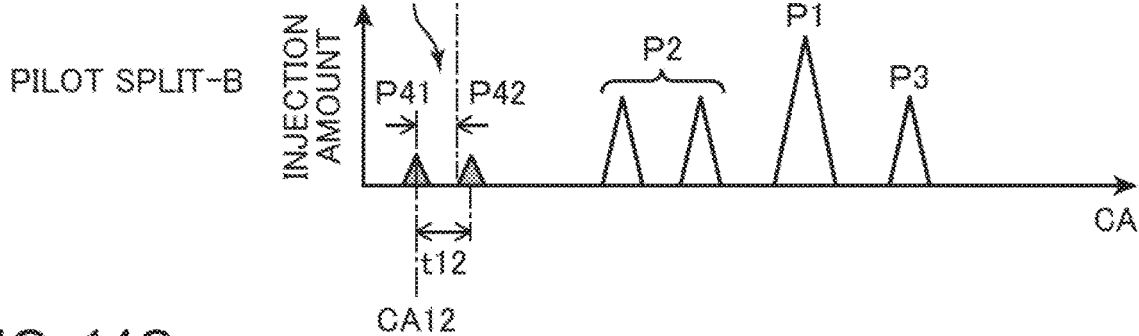
FIG. 14B PILOT SPLIT-B
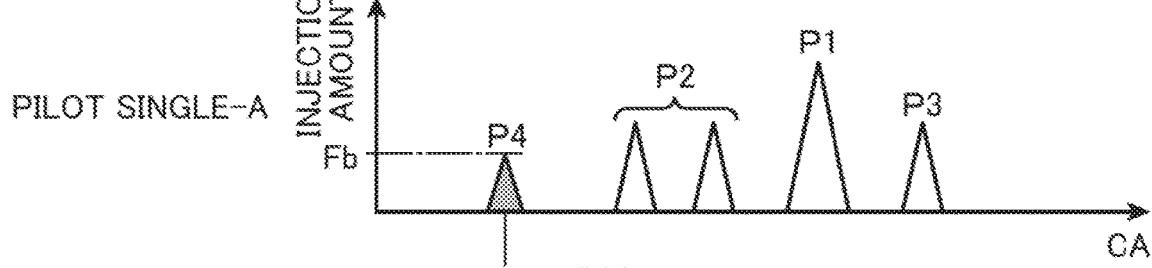
FIG. 14C PILOT SINGLE-A
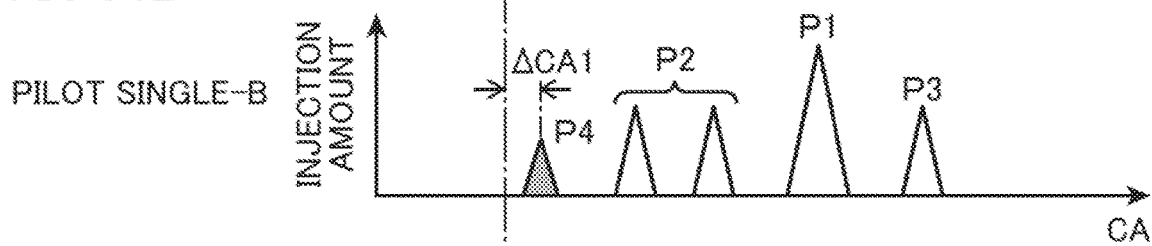
FIG. 14D PILOT SINGLE-B
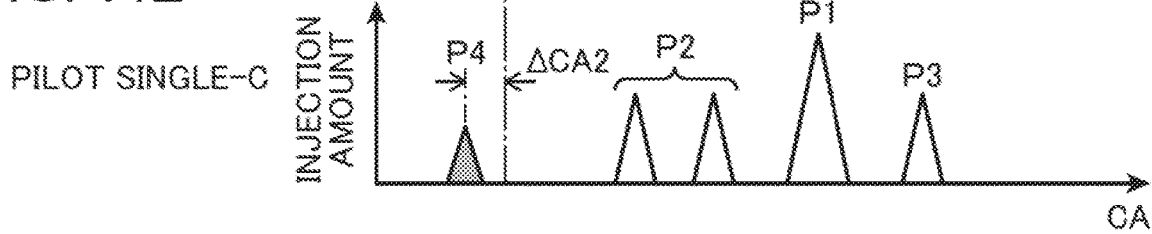
FIG. 14E PILOT SINGLE-C

FUEL INJECTION CONTROL SYSTEM AND FUEL INJECTION CONTROL METHOD FOR DIESEL ENGINE

TECHNICAL FIELD

The present invention relates to a fuel injection control system and a fuel injection control method for a diesel engine in which a part of a combustion chamber is defined by a crown surface of a piston having a cavity.

BACKGROUND

A combustion chamber of a diesel engine for a vehicle such as an automobile is defined by an inner wall surface of a cylinder, a lower surface of a cylinder head (combustion chamber ceiling surface), and a crown surface of a piston. The combustion chamber is supplied with fuel from a fuel injection valve disposed near the radial center of the combustion chamber. A combustion chamber structure configured such that a cavity (recessed portion) is disposed on the crown surface of the piston and fuel is injected from the fuel injection valve toward the cavity is known. French Patent Application Publication No. 2902462 and Japanese Patent No. 4906055 disclose a fuel injection control system that has a combustion chamber structure in which the cavity has a two-step structure of an upper cavity and a lower cavity, and injects fuel to a branch portion of the two-step structure cavity and disperses the fuel to the upper cavity and the lower cavity.

If the two-step structure cavity is employed, an in-cylinder flow of an air-fuel mixture containing the fuel injected from the fuel injection valve is separated at the branch portion into a flow toward the upper cavity and a flow toward the lower cavity, forming a rotational flow in each cavity. Since a one-step structure cavity does not cause the separation, a relatively strong rotational flow is formed along the cavity. In contrast, the rotational flow of the two-step structure cavity is relatively weak due to the separation. Therefore, a tendency is demonstrated that air present in a radial central region of the combustion chamber is less likely to be drawn into a radial outer side of the combustion chamber because of the rotational flow. In this case, a problem occurs that an air usage rate decreases, that is, oxygen remaining in the radial central region of the combustion chamber cannot be used effectively.

SUMMARY

An object of the present invention is to provide a fuel injection control system for a diesel engine including a cavity on a crown surface of a piston, and a fuel injection control method which are able to effectively use air in a combustion chamber to form a homogeneous, thin air-fuel mixture and to inhibit generation of soot and the like as much as possible.

A fuel injection control system for a diesel engine according to one aspect of the present invention includes: a combustion chamber of an engine, formed with a lower surface of a cylinder head, a cylinder, and a crown surface of a piston; a fuel injection valve configured to inject fuel into the combustion chamber; and a fuel injection control device including a processer and configured to control an operation of the fuel injection valve. The crown surface of the piston includes a cavity. The cavity includes: a first cavity portion disposed in a radial central region of the crown surface, the first cavity portion including a first bottom having a first depth in a cylinder axial direction; a second cavity portion disposed on an outer peripheral side of the first cavity portion in the crown surface, the second cavity portion including a second bottom having a depth shallower than the first depth in the cylinder axial direction; and a joint portion connecting the first cavity portion and the second cavity portion. The fuel injection valve is configured to inject the fuel toward the cavity and is disposed at or near a radial center of the combustion chamber.

The fuel injection control device is configured to cause the fuel injection valve to execute at least: a main injection to inject the fuel at timing when the piston is positioned near a compression top dead center; a pilot injection to inject the fuel at timing earlier than the main injection; and a low penetration injection to inject the fuel at timing earlier than the pilot injection or timing later than the main injection. The fuel injection control device is configured to execute: a first injection control module to execute at least one of the main injection or the pilot injection at timing of injecting the fuel toward the joint portion; and a second injection control module to execute the low penetration injection to inject the fuel only into the radial central region of the combustion chamber.

In a fuel injection control system for a diesel engine according to another aspect of the present invention, the fuel injection control device is configured to cause the fuel injection valve to execute at least: a first injection to inject the fuel at timing when the piston is positioned near a compression top dead center; a second injection to inject the fuel at timing earlier than the first injection; and a third injection to inject the fuel at timing earlier than the second injection or timing later than the first injection. The fuel injection control device is configured to execute: a first injection control module to execute at least one of the first injection or the second injection at timing of injecting the fuel toward the joint portion; and a second injection control module that executes the third injection.

The second injection control module: estimates a rotational diameter of a rotational flow generated in the first cavity portion based on injection pressure, injection amount, and injection timing of the first injection or the second injection by the first injection control module; the rotational flow being an in-cylinder flow of an air-fuel mixture containing the injected fuel, estimates an oxygen residual feasible region generated in the radial central region of the combustion chamber based on the estimated rotational diameter; and executes the third injection to spray the fuel only into the estimated oxygen residual feasible region.

A fuel injection control method for a diesel engine according to still another aspect of the present invention includes: a first injection step in which the fuel injection valve injects the fuel at timing when the piston is positioned near a compression top dead center; a second injection step in which the fuel injection valve injects the fuel at timing earlier than the first injection; and a third injection step in which the fuel injection valve injects the fuel at timing earlier than the second injection or timing later than the first injection.

The third injection step includes: a step of estimating a rotational diameter of a rotational flow generated in the first cavity portion based on injection pressure, injection amount, and injection timing of the first injection or the second injection; the rotational flow being an in-cylinder flow of an air-fuel mixture containing the injected fuel; a step of estimating an oxygen residual feasible region generated in a radial central region of the combustion chamber based on the estimated rotational diameter; and a step in which the fuel injection valve sprays the fuel only into the estimated oxygen residual feasible region.

BRIEF DESCRIPTION OF DRAWINGS

FIGS. 9A to 9C are diagrams for describing a method of setting a target line for the low penetration injection;

FIG. 12 is a diagram showing control divisions in low penetration injection control according to a second embodiment;

FIG. 13 is a tabular diagram showing factors affecting ignition quality of an air-fuel mixture and generation of soot;

FIGS. 14A to 14E are time charts showing a mode of the low penetration injection according to the second embodiment;

DETAILED DESCRIPTION

[Overall Configuration of Engine]

Figure 1:
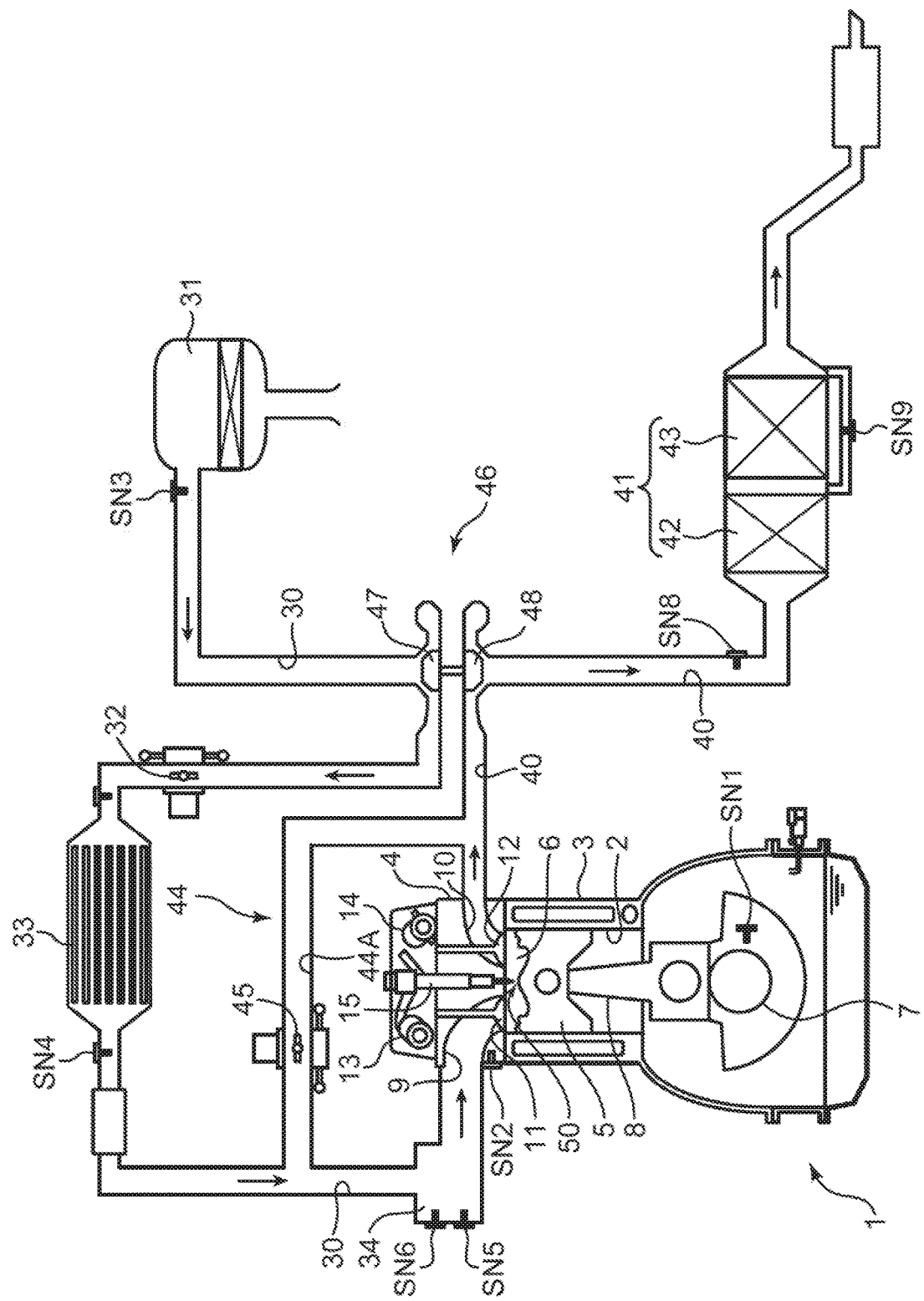
FIG. 1 is a system diagram of a diesel engine to which a fuel injection control system according to the present invention is applied.

Embodiments of a fuel injection control system for a diesel engine according to the present invention will be described in detail below with reference to the drawings. First, an overall configuration of a diesel engine system to which the fuel injection control system according to the present invention is applied will be described with reference to FIG. 1. The diesel engine shown in FIG. 1 is a four-cycle diesel engine to be mounted on a vehicle as a driving power source. The diesel engine system includes an engine body 1 that includes a plurality of cylinders 2 and is driven by supplying a fuel mainly made of light oil, an intake path 30 through which intake air to be introduced into the engine body 1 circulates, an exhaust path 40 through which an exhaust gas discharged from the engine body 1 circulates, an exhaust gas recirculation (EGR) device 44 that recirculates part of the exhaust gas circulating through the exhaust path 40 to the intake path 30, and a turbocharger 46 driven by the exhaust gas passing through the exhaust path 40.

The engine body 1 is an engine that includes a plurality of cylinders 2 arranged in a direction perpendicular to the drawing of FIG. 1 (only one of the cylinders 2 is shown in FIG. 1), and is driven by receiving the fuel supply mainly made of light oil. The engine body 1 includes a cylinder block 3, a cylinder head 4, and pistons 5. The cylinder block 3 has cylinder liners that form the cylinders 2. The cylinder head 4 is attached to an upper surface of the cylinder block 3 and covers upper openings of the cylinders 2. The pistons 5 are housed in the cylinders 2 in a reciprocatingly slidable manner and are coupled to a crankshaft 7 via connecting rods 8. In response to reciprocating motion of the pistons 5, the crankshaft 7 rotates about its central axis. The structure of the pistons 5 will be described in detail later.

Combustion chambers 6 are formed above the pistons 5. Each of the combustion chambers 6 is formed with a lower surface of the cylinder head 4 (combustion chamber ceiling surface 6U, see FIGS. 3 and 4), each of the cylinders 2, and a crown surface 50 of each of the pistons 5. The combustion chamber 6 is supplied with the fuel by injection from an injector 15 to be described later. Then, an air-fuel mixture of the supplied fuel and air is burned in the combustion chamber 6, and the piston 5 pushed down by expansion force of the combustion reciprocates in a vertical direction.

A crank angle sensor SN1 and a water temperature sensor SN2 are attached to the cylinder block 3. The crank angle sensor SN1 detects a rotation angle (crank angle) of the crankshaft 7 and a rotation speed (engine rotation speed) of the crankshaft 7. The water temperature sensor SN2 detects a temperature of cooling water circulating inside the cylinder block 3 and the cylinder head 4 (engine water temperature).

An intake port 9 and an exhaust port 10 communicating with the combustion chamber 6 are formed in the cylinder head 4. An intake side opening, which is a downstream end of the intake port 9, and an exhaust side opening, which is an upstream end of the exhaust port 10, are formed on a lower surface of the cylinder head 4. An intake valve 11 for opening and closing the intake side opening and an exhaust valve 12 for opening and closing the exhaust side opening are assembled in the cylinder head 4. Note that although not shown, a valve type of the engine body 1 is a four-valve type including two intake valves and two exhaust valves. Two intake ports 9 and two exhaust ports 10 are provided for each cylinder 2, and two intake valves 11 and two exhaust valves 12 are also provided.

An intake valve operating mechanism 13 and an exhaust valve operating mechanism 14 including camshafts are disposed in the cylinder head 4. The intake valve 11 and the exhaust valve 12 are driven to open and close by the valve operating mechanisms 13 and 14 in conjunction with rotation of the crankshaft 7. An intake variable valve timing system (VVT) capable of changing at least opening timing of the intake valve 11 is incorporated in the intake valve operating mechanism 13. An exhaust VVT capable of changing at least closing timing of the exhaust valve 12 is incorporated in the exhaust valve operating mechanism 14.

Figure 2A:
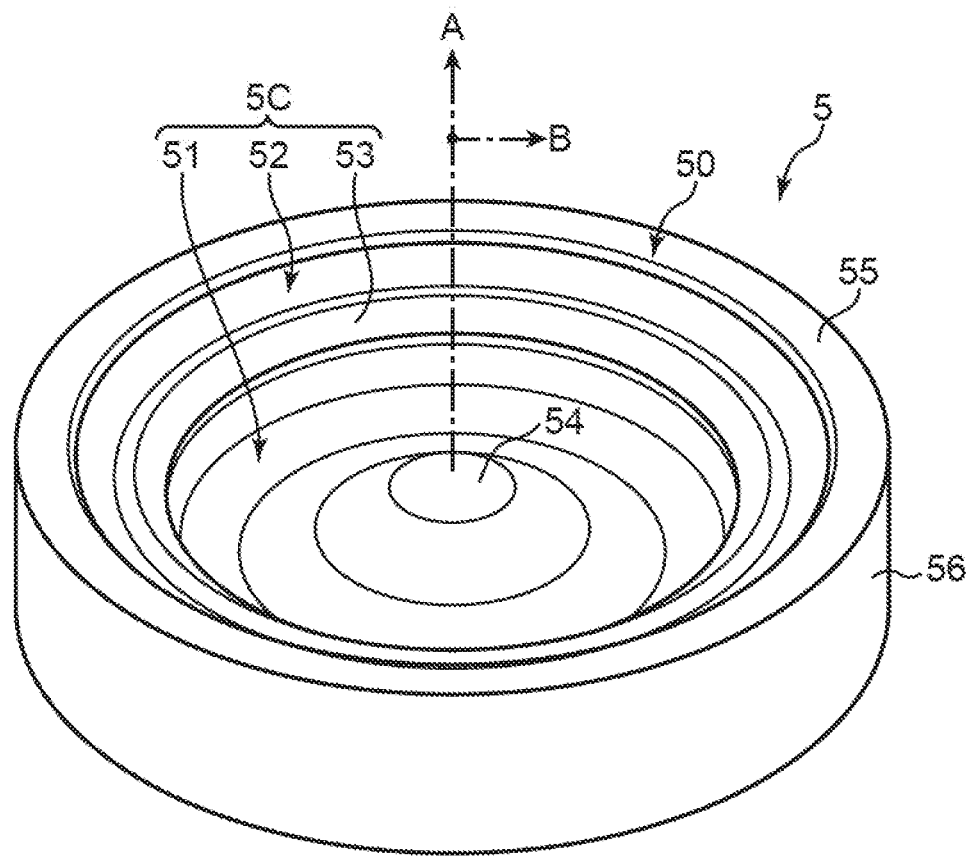
FIG. 2A is a perspective view of a crown surface portion of a piston of the diesel engine shown in FIG. 1.
Figure 2B:
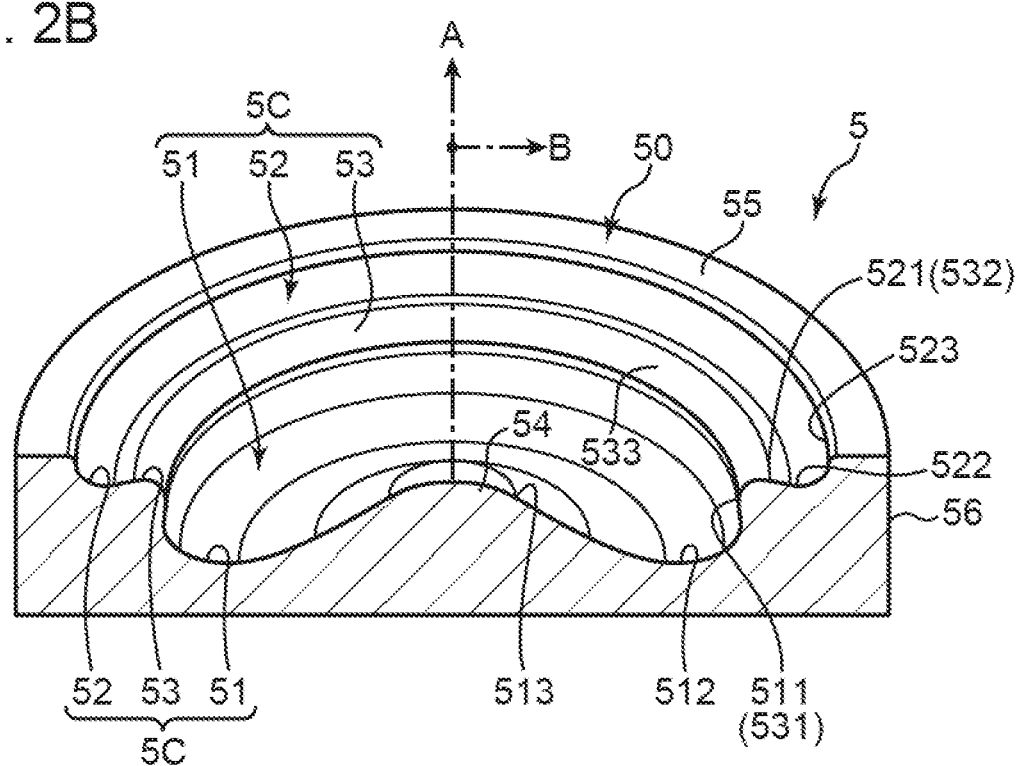
FIG. 2B is a perspective view of the piston with a cross section.
Figure 3:
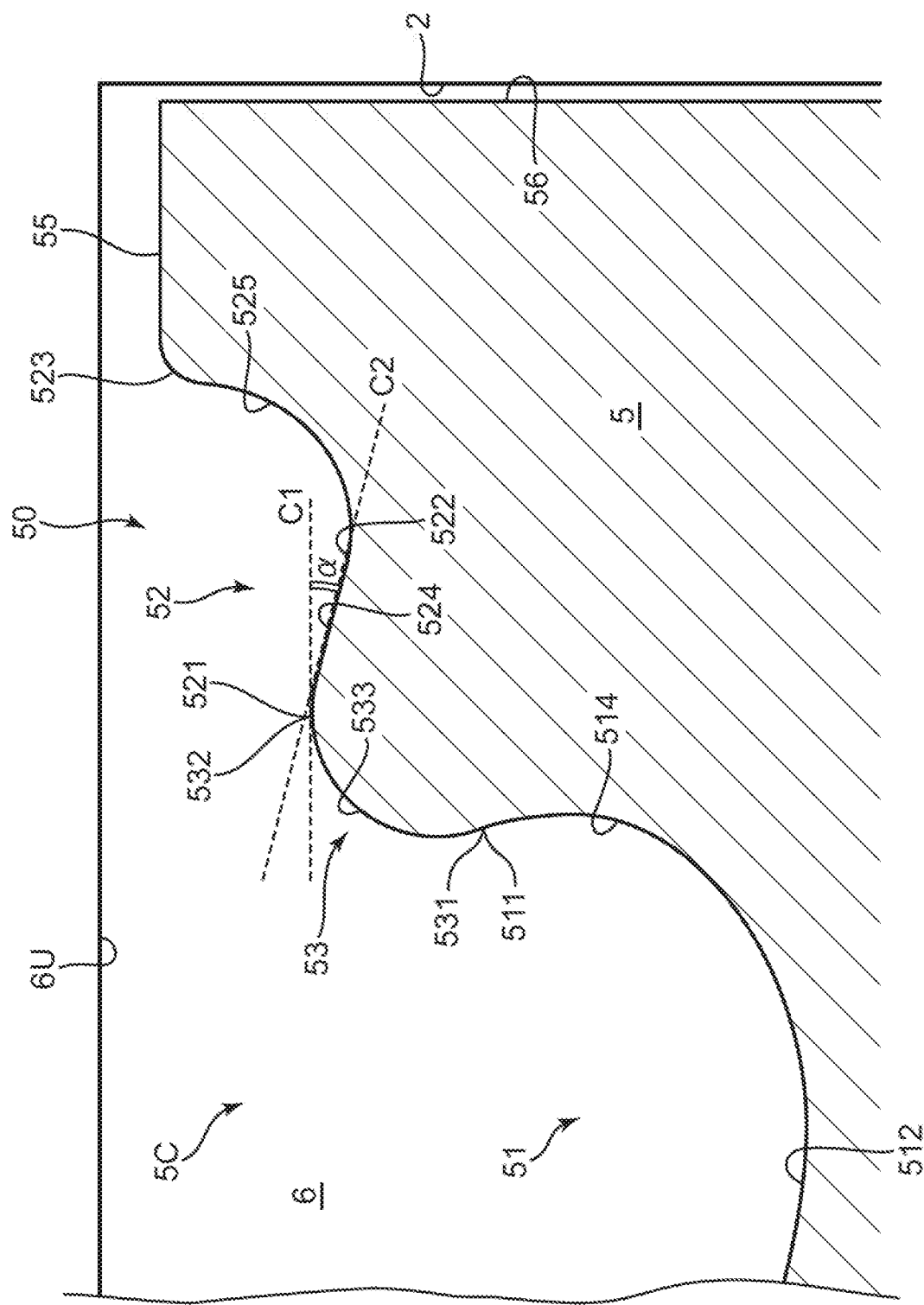
FIG. 3 is an enlarged view of the piston section shown in FIG. 2B.
Figure 4:
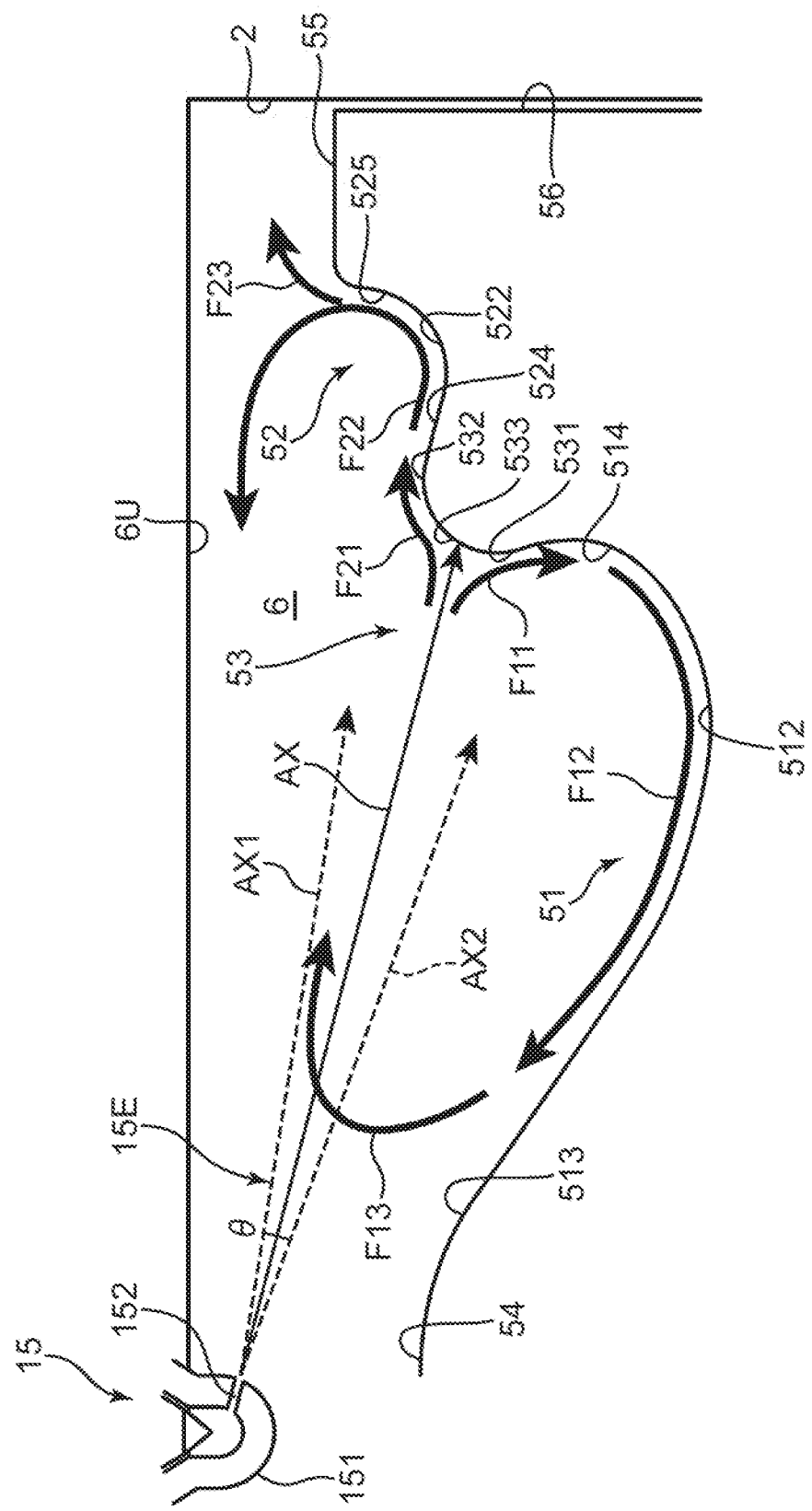
FIG. 4 is a sectional view of the piston for describing a relationship between the crown surface of the piston and an injection axis of fuel by an injector.

One injector 15 (fuel injection valve) for injecting the fuel from its tip into the combustion chamber 6 is attached to the cylinder head 4 for each cylinder 2. The injector 15 injects the fuel supplied through a fuel supply pipe (not shown) into the combustion chamber 6. The injector 15 is assembled to the cylinder head 4 such that the fuel injecting tip (nozzle 151; FIG. 4) is positioned at or near a radial center of the combustion chamber 6. The injector 15 injects the fuel toward a cavity 5C formed on the crown surface 50 of the piston 5 to be described later (FIGS. 2 to 4).

The injector 15 is connected to an accumulator common rail (not shown) common to all the cylinders 2 through the fuel supply pipe. A high-pressure fuel pressurized by a fuel pump (not shown) is stored in the common rail. The fuel accumulated in the common rail is supplied to the injector 15 of each cylinder 2, whereby the fuel is injected from the injector 15 into the combustion chamber 6 at a high pressure (about 50 MPa to 250 MPa). A fuel pressure regulator 16 (not shown in FIG. 1, see FIG. 5) is provided between the fuel pump and the common rail for changing injection pressure, which is the pressure of the fuel injected from the injector 15.

The intake path 30 is connected to one side surface of the cylinder head 4 to communicate with the intake port 9. Air (fresh air) taken in from an upstream end of the intake path 30 is introduced into the combustion chamber 6 through the intake path 30 and the intake port 9. In the intake path 30, an air cleaner 31, the turbocharger 46, a throttle valve 32, an intercooler 33, and a surge tank 34 are disposed in this order from an upstream side of the intake path 30.

The air cleaner 31 removes foreign substances in the intake air to clean the intake air. The throttle valve 32 opens and closes the intake path 30 in conjunction with a pressing down operation of an accelerator (not shown) to adjust a flow rate of intake air in the intake path 30. The turbocharger 46 delivers the intake air to a downstream side of the intake path 30 while compressing the intake air. The intercooler 33 cools the intake air compressed by the turbocharger 46. The surge tank 34 is a tank that is disposed immediately upstream of an intake manifold connected to the intake port 9 and provides a space for evenly distributing the intake air to the plurality of cylinders 2.

An air flow sensor SN3, an intake temperature sensor SN4, an intake pressure sensor SN5, and an intake $O_2$ sensor SN6 are disposed in the intake path 30. The air flow sensor SN3 is disposed downstream of the air cleaner 31 and detects the flow rate of the intake air passing through the portion. The intake temperature sensor SN4 is disposed downstream of the intercooler 33 and detects a temperature of the intake air passing through the portion. The intake pressure sensor SN5 and the intake $O_2$ sensor SN6 are disposed near the surge tank 34, and detect pressure of the intake air and oxygen concentration of the intake air passing through the portions, respectively. Note that although not shown in FIG. 1, an injection pressure sensor SN7 (FIG. 5) for detecting injection pressure of the injector 15 is provided.

The exhaust path 40 is connected to the other side surface of the cylinder head 4 to communicate with the exhaust port 10. The burnt gas (exhaust gas) generated in the combustion chamber 6 is exhausted to the outside of a vehicle through the exhaust port 10 and the exhaust path 40. An exhaust gas purification device 41 is provided in the exhaust path 40. A three-way catalyst 42 for purifying harmful components contained in the exhaust gas circulating in the exhaust path 40 (HC, CO, NOx), and a diesel particulate filter (DPF) 43 for collecting particulate matters contained in the exhaust gas are incorporated in the exhaust gas purification device 41.

An exhaust $O_2$ sensor SN8 and a differential pressure sensor SN9 are disposed in the exhaust path 40. The exhaust $O_2$ sensor SN8 is disposed between the turbocharger 46 and the exhaust gas purification device 41, and detects oxygen concentration of the exhaust gas passing through the portion. The differential pressure sensor SN9 detects differential pressure between an upstream end and a downstream end of the DPF 43.

The EGR device 44 includes an EGR path 44A connecting the exhaust path 40 and the intake path 30, and an EGR valve 45 provided in the EGR path 44A. The EGR path 44A connects a portion upstream of the exhaust path 40 from the turbocharger 46 to a portion of the intake path 30 between the intercooler 33 and the surge tank 34. Note that an EGR cooler (not shown) for cooling the exhaust gas returned from the exhaust path 40 to the intake path 30 (EGR gas) by heat exchange is disposed in the EGR path 44A. The EGR valve 45 regulates a flow rate of the exhaust gas circulating through the EGR path 44A.

The turbocharger 46 includes a compressor 47 disposed on an intake path 30 side and a turbine 48 disposed in the exhaust path 40. The compressor 47 and the turbine 48 are connected by a turbine shaft in an integrally rotatable manner. The turbine 48 rotates in response to energy of the exhaust gas flowing through the exhaust path 40. The rotation of the compressor 47 in conjunction with the rotation of the turbine 48 causes the air circulating through the intake path 30 to be compressed (turbocharged).

[Detailed Structure of Piston]

Subsequently, the structure of the piston 5, in particular the structure of the crown surface 50 will be described in detail. FIG. 2A is a perspective view mainly showing an upper portion of the piston 5. The piston 5 includes an upper piston head and a lower skirt portion, but FIG. 2A shows the piston head portion with the crown surface 50 on top. FIG. 2B is a perspective view of the piston 5 with a radial cross section. FIG. 3 is an enlarged view of the radial cross section shown in FIG. 2B. Note that in FIGS. 2A and 2B, a cylinder axial direction A and a radial direction B of the combustion chamber are indicated by arrows.

The piston 5 includes a cavity 5C, a peripheral flat portion 55, and a side peripheral surface 56. As described above, part of a combustion chamber wall surface that defines the combustion chamber 6 (bottom surface) is formed with the crown surface 50 of the piston 5. The cavity 5C is provided in the crown surface 50. The cavity 5C is a portion where the crown surface 50 is recessed downward in the cylinder axial direction A, and is a portion that receives fuel injection from the injector 15. The peripheral flat portion 55 is an annular flat portion disposed in a region near an outer peripheral edge of the radial direction B of the crown surface 50. The cavity 5C is disposed in a central region of the radial direction B of the crown surface 50 except for the peripheral flat portion 55. The side peripheral surface 56 is a surface in sliding contact with an inner wall surface of the cylinder 2, and is provided with a plurality of ring grooves into which piston rings (not shown) are fitted.

The cavity 5C includes a first cavity portion 51, a second cavity portion 52, a joint portion 53, and a crest portion 54. The first cavity portion 51 is a recess disposed in the central region of the radial direction B of the crown surface 50. The second cavity portion 52 is an annular recess disposed on an outer peripheral side of the first cavity portion 51 in the crown surface 50. The joint portion 53 is a portion that connects the first cavity portion 51 and the second cavity portion 52 in the radial direction B. The crest portion 54 is a mountain-shaped protrusion disposed at a central position in the radial direction B of the crown surface 50 (first cavity portion 51). The crest portion 54 is protruded at a position immediately below the nozzle 151 of the injector 15 (FIG. 4).

The first cavity portion 51 includes a first upper end 511, a first bottom 512 and a first inner end 513. The first upper end 511 is at the highest position in the first cavity portion 51 and is continuous with the joint portion 53. The first bottom 512 is an annular region in top view, and is most recessed in the first cavity portion 51. In the entire cavity 5C, the first bottom 512 is the deepest portion. The first cavity portion 51 has a predetermined depth (first depth) in the cylinder axial direction A at the first bottom 512. In top view, the first bottom 512 is positioned close to an inside of the joint portion 53 in the radial direction B.

The first upper end 511 and the first bottom 512 are connected by a radially recessed portion 514 curved outward in the radial direction B. The radially recessed portion 514 has a portion recessed outward in the radial direction B relative to the joint portion 53. The first inner end 513 is positioned at the radially innermost position in the first cavity portion 51 and is continuous with a lower end of the crest portion 54. The first inner end 513 and the first bottom 512 are connected by a curved surface that is gently curved in a mountain foot shape.

The second cavity portion 52 includes a second inner end 521, a second bottom 522, a second upper end 523, a taper region 524, and a standing wall region 525. The second inner end 521 is positioned at the radially innermost position in the second cavity portion 52 and is continuous with the joint portion 53. The second bottom 522 is the most recessed region in the second cavity portion 52. At the second bottom 522, the second cavity portion 52 has a depth shallower than the first bottom 512 in the cylinder axial direction A. That is, the second cavity portion 52 is a recessed portion positioned above the first cavity portion 51 in the cylinder axial direction A. The second upper end 523 is positioned at the highest position in the second cavity portion 52 and on the radially outermost side, and is continuous with the peripheral flat portion 55.

The taper region 524 is a portion having a plane shape extending from the second inner end 521 to the second bottom 522 and inclined downward to the radial outer side. As shown in FIG. 3, the taper region 524 has an inclination along an inclination line C2 that intersects with a horizontal line C1 extending in the radial direction B at an inclination angle α. The standing wall region 525 is a wall surface formed to rise relatively steeply on the radially outer side relative to the second bottom 522. The wall surface of the second cavity portion 52 has a curved surface curved upward from the horizontal direction from the second bottom 522 to the second upper end 523 in a sectional shape in the radial direction B. The standing wall region 525 is a wall surface close to a vertical wall near the second upper end 523.

The joint portion 53 has a shape protruding radially inward in a bump shape between the first cavity portion 51 positioned on the lower side and the second cavity portion 52 positioned on the upper side in the sectional shape in the radial direction B. The joint portion 53 includes a lower end 531 and a third upper end 532 (upper end of the cylinder axial direction), and a central portion 533 positioned at the center between the lower end 531 and the third upper end 532. The lower end 531 is a continuous portion with the first upper end 511 of the first cavity portion 51. The third upper end 532 is a continuous portion with the second inner end 521 of the second cavity portion 52.

In the cylinder axial direction A, the lower end 531 is the lowermost portion of the joint portion 53, and the third upper end 532 is the uppermost portion. The above-mentioned taper region 524 is also a region extending from the third upper end 532 toward the second bottom 522. The second bottom 522 is positioned below the third upper end 532. That is, the second cavity portion 52 of the present embodiment does not have a bottom surface extending horizontally outward in the radial direction B from the third upper end 532, in other words, the third upper end 532 and the peripheral flat portion 55 are not connected by a horizontal plane. The second cavity portion 52 has a second bottom 522 recessed below the third upper end 532.

The crest portion 54 protrudes upward, and a protruding height of the crest portion 54 is the same as the height of the third upper end 532 of the joint portion 53. The crest portion 54 is more recessed than the peripheral flat portion 55. The crest portion 54 is positioned at the center of the first cavity portion 51 that is circular in top view, whereby the first cavity portion 51 is in a shape of an annular groove formed around the crest portion 54.

[About in-Cylinder Flow after Fuel Injection]

Subsequently, a fuel injection state into the cavity 5C by the injector 15 and a flow of the air-fuel mixture after the injection will be described with reference to FIG. 4. FIG. 4 is a simplified sectional view of the combustion chamber 6. FIG. 4 shows a relationship between the crown surface 50 (cavity 5C) and an injection axis AX of an injected fuel 15E injected from the injector 15. FIG. 4 also shows arrows F11, F12, F13, F21, F22 and F23 schematically representing the flow of the air-fuel mixture after injection.

The injector 15 includes a nozzle 151 disposed to protrude downward from the combustion chamber ceiling surface 6U (lower surface of the cylinder head 4) to the combustion chamber 6. The nozzle 151 includes an injection hole 152 for injecting fuel into the combustion chamber 6. FIG. 4 shows one injection hole 152, but actually, a plurality of injection holes 152 is arranged at an equal pitch in a circumferential direction of the nozzle 151. The fuel injected from the injection hole 152 is injected along the injection axis AX in FIG. 4. The injected fuel diffuses at a spray angle θ. FIG. 4 shows an upper diffusion axis AX1 indicating upward diffusion with respect to the injection axis AX and a lower diffusion axis AX2 indicating downward diffusion. The spray angle θ is an angle formed by the upper diffusion axis AX1 and the lower diffusion axis AX2.

The injection hole 152 can inject the fuel toward the joint portion 53 of the cavity 5C. That is, by causing the injection hole 152 to execute a fuel injection operation at a predetermined crank angle of the piston 5, the injection axis AX can be directed at the joint portion 53. FIG. 4 shows a positional relationship between the injection axis AX and the cavity 5C at the predetermined crank angle. The fuel injected from the injection hole 152 blows at the joint portion 53 while being mixed with air in the combustion chamber 6 to form the air-fuel mixture.

As shown in FIG. 4, the fuel 15E injected toward the joint portion 53 along the injection axis AX collides with the joint portion 53. Then, the fuel 15E is spatially separated into a fuel (arrow F11) traveling in a direction of the first cavity portion 51 (downward) and a fuel (arrow F21) traveling in a direction of the second cavity portion 52 (upward). That is, the fuel injected toward the central portion 533 of the joint portion 53 is separated into upper and lower fuels. Then, the separated fuels are mixed with air present in the first and second cavity portions 51 and 52, and flows along surface shapes of the first and second cavity portions 51 and 52, respectively.

In more detail, the air-fuel mixture traveling in the direction of the arrow F11 (downward) enters the radially recessed portion 514 of the first cavity portion 51 from the lower end 531 of the joint portion 53, and flows downward. Subsequently, the air-fuel mixture changes its flow direction from the downward direction to the inward direction of the radial direction B in accordance with a curved shape of the radially recessed portion 514. The air-fuel mixture then flows in accordance with a bottom surface shape of the first cavity portion 51 having the first bottom 512, as indicated by the arrow F12. At this time, the air-fuel mixture is mixed with air in the first cavity portion 51 to dilute concentration. Due to the presence of the crest portion 54, the bottom surface of the first cavity portion 51 has a shape that rises toward the radial center. Accordingly, the air-fuel mixture flowing in a direction of the arrow F12 is lifted upward, and eventually flows from the combustion chamber ceiling surface 6U toward the radial outer side as shown by the arrow F13. Even in such a flow, the air-fuel mixture is mixed with the air remaining in the combustion chamber 6 to become a homogeneous, thin air-fuel mixture.

Meanwhile, the air-fuel mixture traveling in a direction of the arrow F21 (upward) enters the taper region 524 of the second cavity portion 52 from the third upper end 532 of the joint portion 53, and travels obliquely downward along the inclination of the taper region 524. Then, as shown by the arrow F22, the air-fuel mixture reaches the second bottom 522. Here, the taper region 524 is a surface having an inclination along the injection axis AX. Therefore, the air-fuel mixture can smoothly flow to the radial outer side. That is, due to the presence of the taper region 524 and the presence of the second bottom 522 positioned below the third upper end 532 of the joint portion 53, the air-fuel mixture can reach a deep position on the radial outer side of the combustion chamber 6.

Thereafter, the air-fuel mixture is lifted upward by a rising curved surface between the second bottom 522 and the standing wall region 525, and flows radially inward from the combustion chamber ceiling surface 6U. In such a flow indicated by the arrow F22, the air-fuel mixture is mixed with the air in the second cavity portion 52 to become a homogeneous, thin air-fuel mixture. Here, due to the presence of the standing wall region 525 extending generally in the vertical direction on the radial outer side of the second bottom 522, the injected fuel (air-fuel mixture) is prevented from reaching an inner peripheral wall of the cylinder 2 (generally, a liner not shown is present). That is, the air-fuel mixture can flow to a place near the radial outer side of the combustion chamber 6 due to the formation of the second bottom 522. However, the presence of the standing wall region 525 prevents interference with the inner peripheral wall of the cylinder 2. This makes it possible to inhibit the occurrence of cooling loss due to the interference.

As described above, the fuel injected toward the joint portion 53 along the injection axis AX collides with the joint portion 53 and is spatially separated, generating the air-fuel mixture using the air present in spaces of the first and second cavity portions 51 and 52. This makes it possible to form a homogeneous, thin air-fuel mixture by widely using the space of the combustion chamber 6, and to inhibit generation of soot and the like during combustion.

[Control Configuration]

Figure 5:
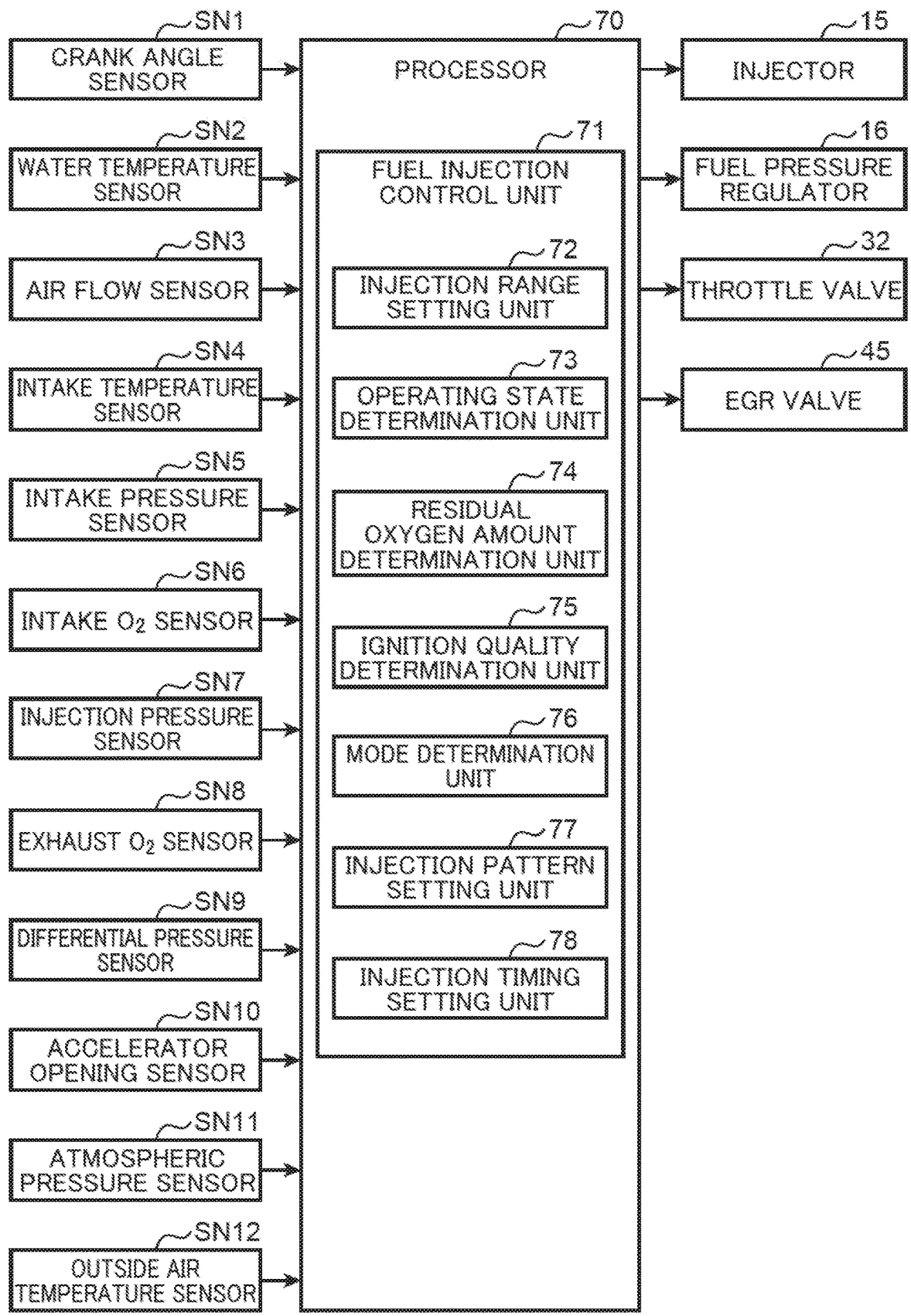
FIG. 5 is a block diagram showing a control system of the diesel engine.

FIG. 5 is a block diagram showing a control configuration of the diesel engine system. The engine system of the present embodiment is centrally controlled by a processor 70 (fuel injection control system for diesel engine). The processor 70 includes components such as a central processing unit (CPU), a read-only memory (ROM), and a random-access memory (RAM). The processor 70 receives detection signals from various sensors mounted on the vehicle. In addition to the sensors SN1 to SN9 described above, the vehicle includes an accelerator opening sensor SN10 for detecting accelerator opening, an atmospheric pressure sensor SN11 for measuring atmospheric pressure of a running environment of the vehicle, and an outside air temperature sensor SN12 for measuring an air temperature of the running environment of the vehicle.

The processor 70 is electrically connected to the above-described crank angle sensor SN1, the water temperature sensor SN2, the air flow sensor SN3, the intake temperature sensor SN4, the intake pressure sensor SN5, the intake $O_2$ sensor SN6, the injection pressure sensor SN7, the exhaust $O_2$ sensor SN8, the differential pressure sensor SN9, the accelerator opening sensor SN10, the atmospheric pressure sensor SN11, and the outside air temperature sensor SN12. The processor 70 sequentially receives information detected by the sensors SN1 to SN12, that is, the crank angle, engine rotation speed, engine water temperature, intake flow rate, intake temperature, intake pressure, intake oxygen concentration, injection pressure of the injector 15, exhaust oxygen concentration, accelerator opening, outside air temperature, and air pressure.

The processor 70 controls each part of the engine while executing various determinations and calculations based on input signals from the sensors SN1 to SN12 and other devices. That is, the processor 70 is electrically connected to devices such as the injector 15 (fuel pressure regulator 16), the throttle valve 32, and the EGR valve 45, and outputs control signals to these devices based on results of the above calculations and other information.

The processor 70 functionally includes a fuel injection control unit 71 (fuel injection control device/first injection control unit, second injection control unit) that controls an operation of the injector 15. In the present embodiment, the fuel injection control unit 71 causes the injector 15 to execute at least a main injection (first injection) to inject fuel at timing when the piston 5 is positioned near a compression top dead center, a pilot injection (second injection) to inject fuel at timing earlier than the main injection, and a low penetration injection (third injection) to inject fuel at timing earlier than the pilot injection or timing later than the main injection.

Here, the main injection and the pilot injection are fuel injections widely used in conventional combustion control. There are many modes of these injections. An after injection is executed at timing later than the main injection in some cases to inhibit soot. In addition to these injections, the present embodiment is characterized in that the low penetration injection is executed with penetration limited than other injections. As will be described in detail later, the low penetration injection is a fuel injection for effectively using the air (oxygen) remaining in the radial central region of the combustion chamber 6. The fuel injection control unit 71 executes: first injection control to execute at least one of the main injection or the pilot injection at timing to inject fuel toward the joint portion 53 of the cavity 5C; and second injection control to execute the low penetration injection to inject fuel only in the radial central region of the combustion chamber 6.

The fuel injection control unit 71 functionally includes an injection range setting unit 72, an operating state determination unit 73, a residual oxygen amount determination unit 74, an ignition quality determination unit 75, a mode determination unit 76, an injection pattern setting unit 77, and an injection timing setting unit 78.

The injection range setting unit 72 sets a penetration target for each of the fuel injections described above. In particular, in the low penetration injection described above, the injection range setting unit 72 predicts a mode of the in-cylinder rotational flow formed by the cavity 5C, and sets the penetration target (to be described in detail later with reference to FIG. 9).

The operating state determination unit 73 determines the operating state of the engine body 1 from information such as the engine rotation speed based on detected values of the crank angle sensor SN1, and the engine load based on opening information of the accelerator opening sensor SN10. A result of this determination is used to determine whether the engine body 1 is in an operation mode to execute the low penetration injection.

The residual oxygen amount determination unit 74 determines an oxygen usage state in the combustion chamber 6, that is, whether residual oxygen is generated in the combustion chamber 6, and a remaining oxygen amount level, based on detected values of the exhaust $O_2$ sensor SN8. Note that regardless of the detected values of the exhaust $O_2$ sensor SN8, the residual oxygen amount determination unit 74 may derive the residual oxygen by model calculation with reference to information such as an intake amount detected by the air flow sensor SN3 and a fuel injection amount from the injector 15.

The ignition quality determination unit 75 determines whether the combustion chamber 6 is in a condition that the air-fuel mixture is relatively likely to ignite (high ignition quality) or a condition that the air-fuel mixture is relatively unlikely to ignite (low ignition quality), based on information such as the outside air temperature (outside air temperature sensor SN12), air pressure (atmospheric pressure sensor SN11), engine rotation speed (crank angle sensor SN1), engine load (accelerator opening sensor SN10), engine water temperature (water temperature sensor SN2), EGR amount (intake $O_2$ sensor SN6), turbocharging pressure (intake pressure sensor SN5), based on detection results of the various sensors described above.

The mode determination unit 76 determines the current operation mode based on the injection pressure of the injector 15 detected by the injection pressure sensor SN7, or by receiving injection pressure setting value data calculated in accordance with the engine load.

The injection pattern setting unit 77 sets the fuel injection pattern of the injector 15 in accordance with various conditions. In the low penetration injection described above, the injection pattern setting unit 77 sets the injection pattern for the low penetration injection in accordance with the operation mode determined by the mode determination unit 76. Variable elements of this injection pattern includes rough execution timing of the low penetration injection (for example, timing earlier than the pilot injection or timing later than the main injection), the number of low penetration injections (single injection or split injection).

The injection timing setting unit 78 sets the timing of fuel injection of the injector 15 in accordance with various conditions. In the low penetration injection, the injection timing setting unit 78 retards or advances the execution timing of the low penetration injection, with reference to the residual oxygen amount detected by the residual oxygen amount determination unit 74 and the ignition quality of the air-fuel mixture determined by the ignition quality determination unit 75.

[Reason why Low Penetration Injection is Needed]

As described above, by employing the two-step structure cavity including the first and second cavity portions 51 and 52, it is possible to expect an advantage of effectively using the air in the combustion chamber 6, especially the air in a squish region of the radial outer side to form the homogeneous, thin air-fuel mixture, an advantage of inhibiting the occurrence of cooling loss through the inner peripheral wall of the cylinder 2, and other advantages. Meanwhile, the inventors have found that the air usage rate in the radial central region of the combustion chamber 6 tends to decrease when the two-step structure cavity is employed. This point will be described with reference to FIG. 6.

Figure 6A:
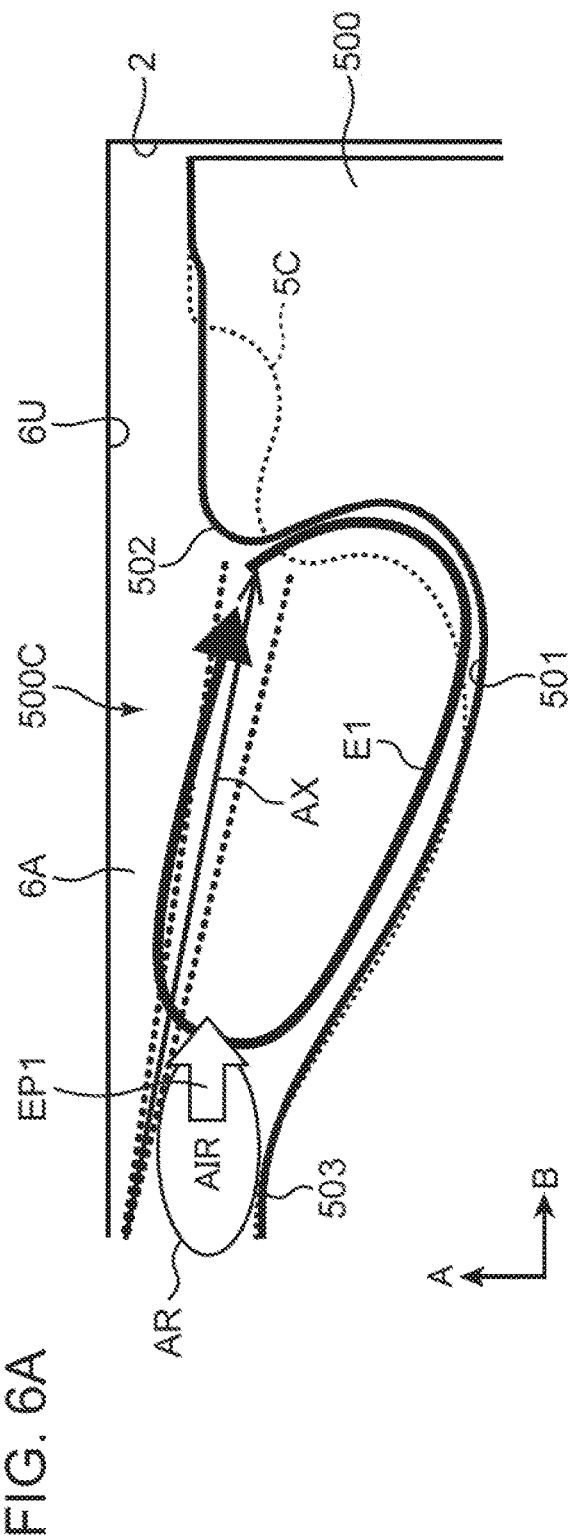
FIG. 6A is a diagram schematically showing an in-cylinder rotational flow when a cavity according to a comparative example is employed.

FIG. 6A is a diagram schematically showing an in-cylinder rotational flow when a cavity according to a comparative example is employed. The piston 500 of the comparative example includes a one-step structure cavity 500C. The cavity 500C includes a cavity portion 501, a cavity edge 502 that is an opening edge of the radial outer side of the cavity portion 501, and a crest portion 503 protruding in a central region of the radial direction B. The cavity portion 501 has an egg-shaped curved sectional shape.

In a combustion chamber 6A defined by such a cavity 500C, it is assumed that fuel is injected from an injector (not shown) toward the cavity edge 502 along the injection axis AX. In this case, the in-cylinder flow of the air-fuel mixture containing the injected fuel is a rotational flow E1 indicated by an arrow in FIG. 6A. The rotational flow E1 blows at the cavity edge 502, sequentially travels downward in the axial direction A and inward in the radial direction B along a shape of the cavity portion 501, and is guided upward by the crest portion 503, and makes a flow traveling outward of the radial direction B. Such a rotational flow E1 is a relatively strong vortex, and drawing force EP1 for drawing air AR present in the radial central region of the combustion chamber 6A (near above the crest portion 503) outward of the radial direction B is also strong. Therefore, the air-fuel mixture can be formed by using the air AR of the radial central region.

Figure 6B:
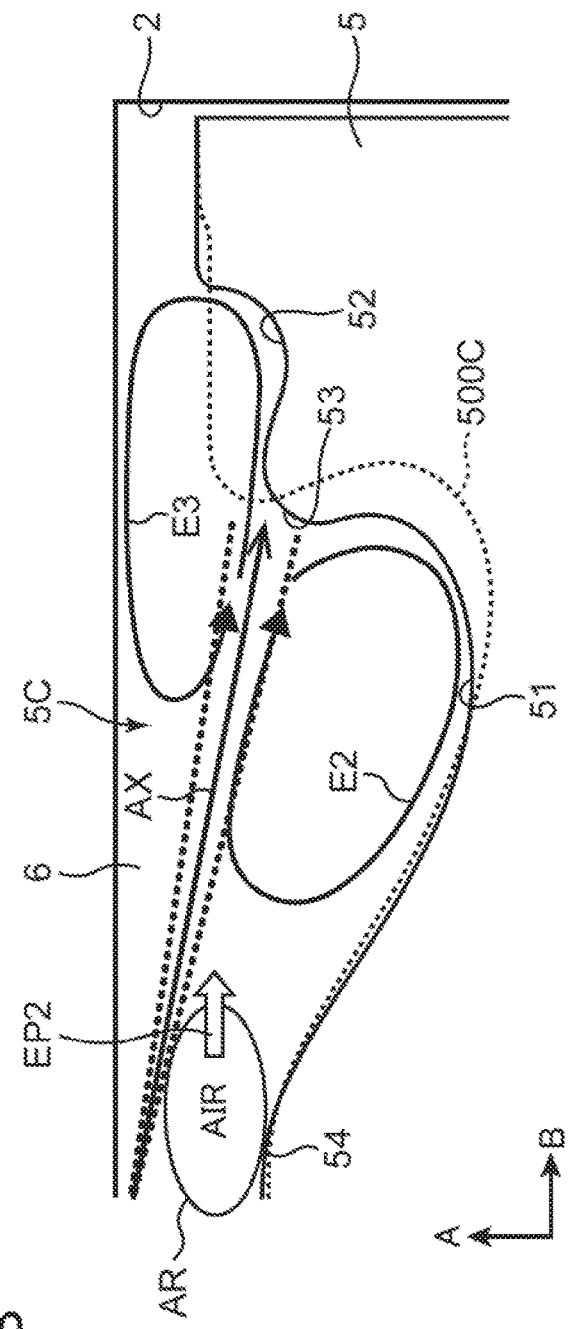
FIG. 6B is a schematic diagram showing the in-cylinder rotational flow when a cavity according to the present embodiment is employed.

Meanwhile, FIG. 6B is a schematic diagram showing the in-cylinder rotational flow when the piston 5 including the two-step structure cavity 5C according to the present embodiment is employed. In the combustion chamber 6, it is assumed that fuel is injected from the injector (not shown) to the joint portion 53 along the injection axis AX. In this case, the in-cylinder flow of the air-fuel mixture is branched at the joint portion 53 and separated into a flow toward the first cavity portion 51 on the lower side of the axial direction A and a flow toward the second cavity portion 52 on the upper side. Then, the lower rotational flow E2 and the upper rotational flow E3 are formed in the first cavity portion 51 and the second cavity portion 52, respectively. The lower rotational flow E2 is a flow similar to the rotational flow E1, and sequentially travels downward in the axial direction A and inward in the radial direction B along a shape of the first cavity portion 51, and is guided upward by the crest portion 54, and travels outward in the radial direction B. The upper rotational flow E3 is a flow that is directed from the outer side of the radial direction B to the upper side of the axial direction A and then travels inward in the radial direction B sequentially. It can be understood that the air in the squish region can be used by the formation of the upper rotational flow E3 better than the one-step structure cavity 500C.

However, the two-step structure cavity 5C tends to be inferior to the one-step structure cavity 500C in the usage rate of the air AR in the radial central region of the combustion chamber 6. That is, for the two-step structure cavity 5C, since the rotational flow is separated into the lower rotational flow E2 and the upper rotational flow E3, drawing force EP2 for drawing the air AR outward in the radial direction B is also relatively weak. That is, the lower rotational flow E2 contributing to the drawing of the air AR is weaker than the rotational flow E1 of the comparative example due to the separation of the rotational flow, weakening the vortex-based drawing force EP2.

Figure 7A:
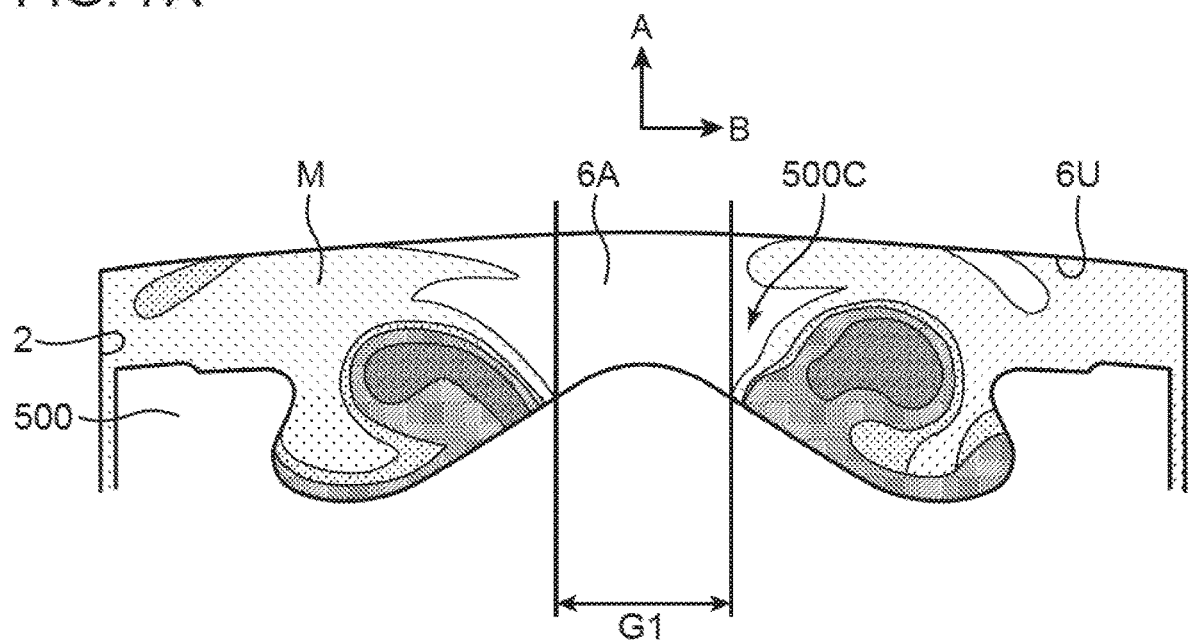
FIG. 7A is a sectional view showing residual air generated in a combustion chamber when the cavity according to the comparative example is employed.
Figure 7B:
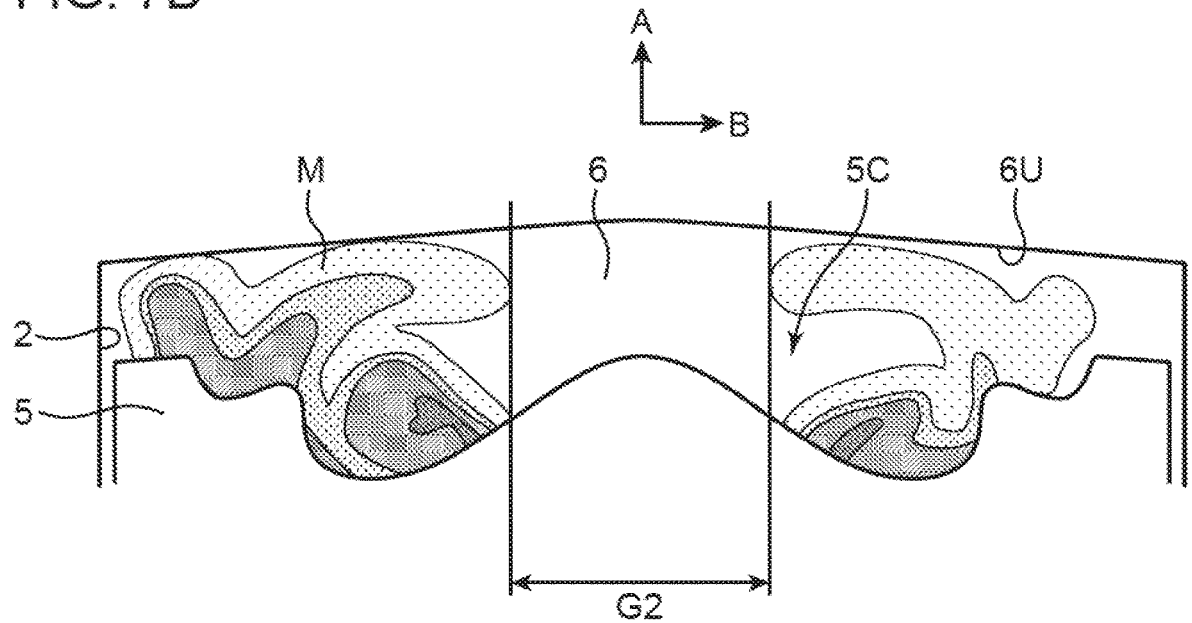
FIG. 7B is a sectional view showing the residual air generated in the combustion chamber when the cavity according to the present embodiment is employed.

FIG. 7A is a sectional view showing a situation of residual air generated in the combustion chamber 6A when the cavity 500C according to the comparative example is employed. FIG. 7B is a sectional view showing a situation of residual air generated in the combustion chamber 6 when the cavity 5C according to the present embodiment is employed. As described with reference to FIG. 6A, the rotational flow E1 of relatively strong vortex is formed in the comparative example. Therefore, as shown in FIG. 7A, the air present in the central region in the radial direction B of the combustion chamber 6A is likely to be drawn into the rotational flow E1, and an oxygen residual feasible region G1 where unused air (oxygen) can remain is a relatively narrow region.

Meanwhile, in the cavity 5C according to the present embodiment, as described with reference to FIG. 6B, since the lower rotational flow E2 is a relatively weak vortex, the air present in the radial central region of the combustion chamber 6 is less likely to be drawn. That is, it becomes difficult for the air to travel outward in the radial direction B. Therefore, as shown in FIG. 7B, an oxygen residual feasible region G2 where unused air (oxygen) can remain occupies a wide area in the radial central region. Therefore, a problem arises that the oxygen remaining in the radial central region of the combustion chamber 6 cannot be used effectively.

[Use of Residual Air by Low Penetration Injection]

Figure 8:
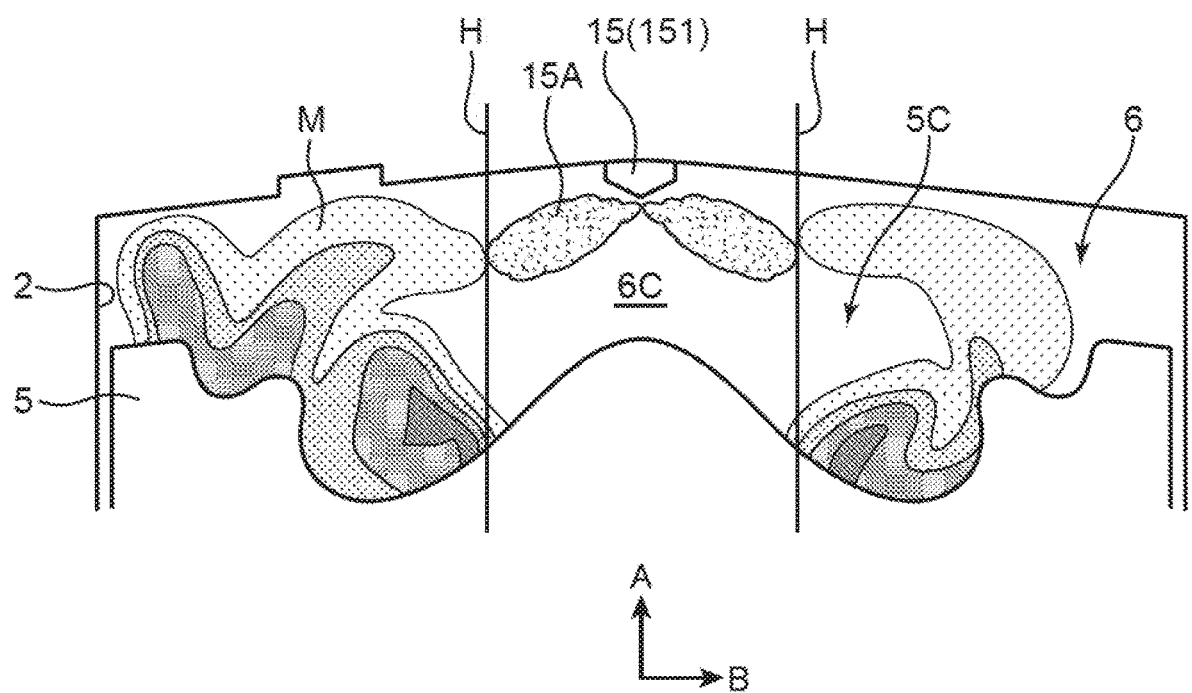
FIG. 8 is a sectional view of the combustion chamber showing execution of low penetration injection according to the present embodiment.

In view of the above problem, in the present embodiment, in addition to the main injection and the pilot injection, which are generally executed in combustion control of a diesel engine, the low penetration injection is executed to inject fuel only into the radial central region in the combustion chamber 6. FIG. 8 is a sectional view of the combustion chamber 6 showing a situation of executing low penetration injection 15A from the injector 15.

The low penetration injection 15A is an injection of using the air remaining in the central region of the radial direction B of the combustion chamber 6 to generate the air-fuel mixture. For this reason, spray penetration of the low penetration injection 15A is set at an outer edge H of a region where air (oxygen) can be present in the radial central region of the combustion chamber 6. In other words, the low penetration injection 15A is an injection that causes the speed of the spray directed outward in the radial direction B to become zero when reaching the outer edge H. The outer edge H corresponds to the outer edge of the oxygen residual feasible region G2 previously shown in FIG. 7B. Note that a diameter of the oxygen residual feasible region G2 defined by the outer edge H is at most about half a diameter of the combustion chamber 6.

Here, the spray penetration of the low penetration injection 15A may be set on an inner side of the radial direction B from the outer edge H. However, it is preferable to set the outer edge H as the spray penetration from a viewpoint of using the oxygen in the oxygen residual feasible region G2 as much as possible. Note that setting the spray penetration outside of the outer edge H in the radial direction B, which may cause an excessively fuel rich region, is preferably avoided.

From the above reason, when the low penetration injection 15A is executed, the injection range setting unit 72 (FIG. 5; second injection control unit) sets the outer edge H as the target line for the spray penetration. This outer edge H, which cannot be detected by a sensor or the like, can be estimated from a position where the rotational flow generated in the combustion chamber 6 (lower rotational flow E2 and upper rotational flow E3) reaches in the radial direction B.

FIGS. 9A to 9C are diagrams for describing a method of setting a target line H1 of the low penetration injection 15A. It can be said that the oxygen residual feasible region G2 where unused air will stay is generated in a region where the vortexes of the lower rotational flow E2 and the upper rotational flow E3 are not generated, or a region where the vortexes do not reach. Therefore, the target line H1 can be derived by determining an inner boundary line in the radial direction B reached by the rotational flow.

Sizes of the rotational flows of the lower rotational flow E2 and the upper rotational flow E3 generated in the combustion chamber 6 having the two-step structure cavity 5C are determined by factors such as spray penetration of injection with the highest energy per cycle (generally main injection), allocation of the spray penetration to the upper and lower cavity portions 51 and 52, shape (rotational curvature) and volume (rotational distance) of the cavity portions 51 and 52. As shown in FIG. 9A, the rotational flows E2 and E3 become vortexes having rotational diameters in the radial direction B that fluctuate in accordance with the above factors. Since the shape and volume of the cavity 5C are fixed, a variable factor of the rotational diameter is the spray penetration and allocation of the spray penetration. A position where the outermost peripheral portions of the rotational flows E2 and E3 are closest to the center of the combustion chamber 6 in the radial direction B is the above-described boundary line, that is, the target line H1. In the present embodiment, the target line H1 is exclusively determined by the rotational diameter of the lower rotational flow E2 generated in the first cavity portion 51 disposed radially inward of the second cavity portion 52.

The spray penetration of the main injection is determined by the injection pressure and injection amount of the fuel from the injector 15, as shown in FIG. 9B. That is, as an integrated value of the injection pressure and the injection amount increases, the spray penetration also increases, which means that the rotational diameter of the rotational flow (rotational energy) also increases. Meanwhile, allocation of the spray penetration to the upper and lower cavity portions 51 and 52 depends on a positional relationship between the injection axis AX and the cavity portions 51 and 52, that is, injection timing.

FIG. 9C is a graph showing a relationship between the injection timing and the spray penetration in the lower first cavity portion 51. Since the main injection is generally executed after the compression top dead center, the piston 5 descends more as the injection timing is retarded. Therefore, as the injection timing is retarded, the injection axis AX is directed more at the upper side than the joint portion 53, that is, at the second cavity portion 52 side. That is, as the injection timing is retarded, the spray penetration allocated to the first cavity portion 51 becomes smaller, and hence the rotational diameter of the lower rotational flow E2 (rotational energy) also becomes smaller.

As described above, the rotational diameter of the lower rotational flow E2 can be estimated from the injection pressure, injection amount, and injection timing of the main injection. The injection range setting unit 72 (FIG. 5) estimates the size of the oxygen residual feasible region G2 (FIG. 7B) generated in the radial central region of the combustion chamber 6 based on the estimated rotational diameter of the lower rotational flow E2. Next, the injection range setting unit 72 sets the outer edge H of the oxygen residual feasible region G2 (FIG. 8) as the target line H1 for the low penetration injection. Then, the fuel injection control unit 71 refers to the injection pressure set based on the operating states of the engine at this control timing, sets the injection amount with which the penetration target is the target line H1, and then executes the low penetration injection. By executing such low penetration injection, the air-fuel mixture can be formed from the air remaining in the oxygen residual feasible region G2 and the fuel sprayed by the low penetration injection. As a result, it is possible to effectively use the air in the combustion chamber 6 to form the homogeneous, thin air-fuel mixture, and to implement high-quality diesel combustion in which generation of soot and the like is inhibited.

First Embodiment

Subsequently, a first embodiment of low penetration injection control will be described. The first embodiment shows a simple example of selecting at which timing to execute the low penetration injection described above from among "timing earlier than the pilot injection" (hereinafter referred to as "PILOT region") and "timing later than the main injection" (hereinafter referred to as "AFTER region"), in accordance with the ignition quality of the air-fuel mixture in the combustion chamber 6.

FIGS. 10A to 10D are time charts showing modes of the low penetration injection (third injection) according to the first embodiment. Here, timing of injection executed per one cycle (crank angle CA) and its injection amount are schematically shown. The injection pattern setting unit 77 of the fuel injection control unit 71 sets at least injection patterns as shown in FIGS. 10A to 10D, and causes the injector 15 to execute the fuel injection.

Figure 10A:
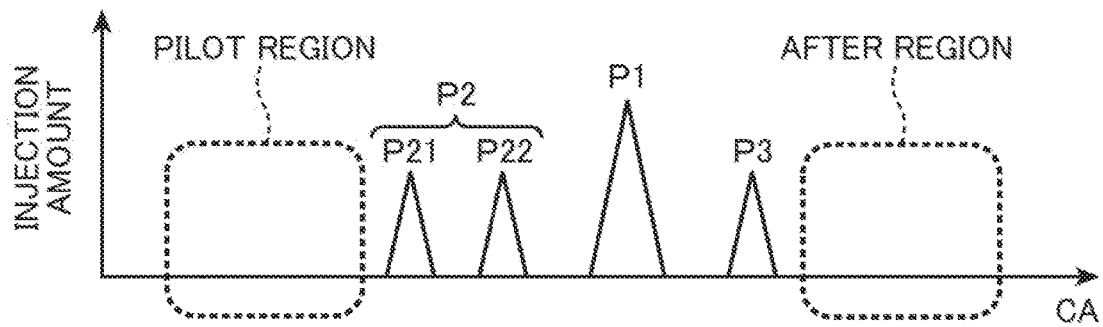
FIGS. 10A to 10D are time charts showing a mode of the low penetration injection according to a first embodiment.

FIG. 10A shows a basic injection pattern when the low penetration injection is not executed. FIG. 10A shows an example in which main injection P1, pilot injection P2, and after injection P3 are executed as the basic injection pattern. The main injection P1 is an injection having the largest energy (injection amount), and is an injection that is executed near the compression top dead center (for example, 2 to 6 deg_ATDC). The pilot injection P2 is an injection that is executed at timing earlier than the main injection P1 (for example, 1 to 10 deg_BTDC), and is executed to create the air-fuel mixture in advance to increase the ignition quality. FIG. 10A shows an example in which the pilot injection P2 is executed twice, first pilot injection P21 and second pilot injection P22. The after injection P3 is an injection that is executed at timing later than the main injection P1 (for example, 8 to 15 deg_ATDC), and is executed to burn the fuel completely and prevent generation of soot. Note that the injections P1, P2, and P3 are injections in which the spray penetration is not limited to the central region within the target line H1, like the low penetration injection described above.

Figure 10B:
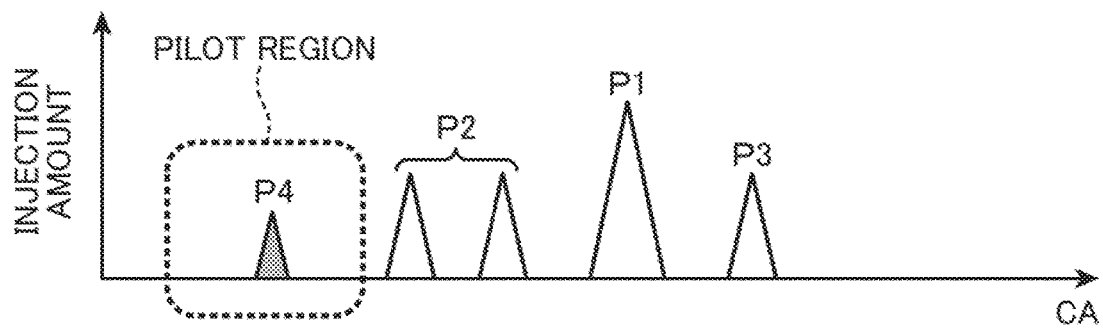

FIG. 10B shows an injection pattern in which low penetration injection P4 is executed in the PILOT region that is advanced from the pilot injection P2. Since the spray penetration is limited to the target line H1 in the low penetration injection P4, the injection amount is generally smaller than the injections P1, P2, P3 of the basic injection pattern.

The injection pattern of FIG. 10B is employed when the ignition quality determination unit 75 determines that a condition that the air-fuel mixture is unlikely to ignite in the combustion chamber 6 (low ignition quality) is satisfied. The following conditions will lead to the low ignition quality, for example, when the engine rotation speed is low, the engine load is low, the engine water temperature is low, the outside air temperature is low, high altitude running (low air pressure), and the EGR amount is large. Under such low ignition quality conditions, by injecting fuel early in the stage of PILOT region in the oxygen residual feasible region G2 (FIG. 7B) in the radial center of the combustion chamber 6, homogenization of fuel and air progresses, and the ignition quality of the region can be enhanced. Conversely, when it is determined that a condition that the air-fuel mixture is likely to ignite (high ignition quality) is satisfied, premature ignition can occur, and thus the low penetration injection P4 in the PILOT region is avoided.

Figure 10C:
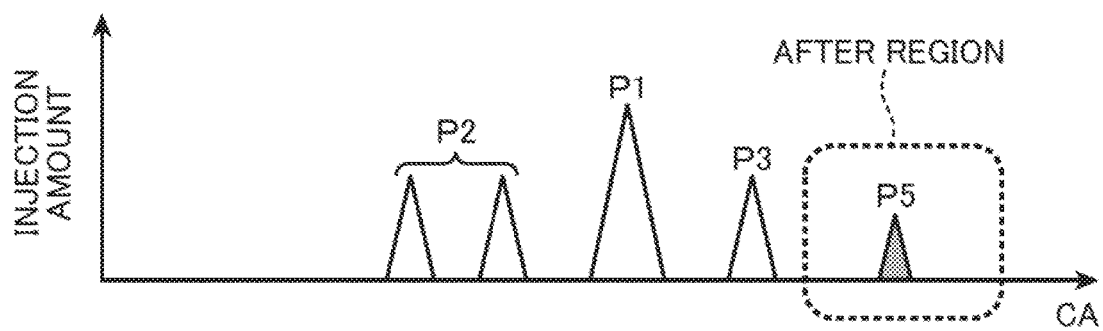

FIG. 10C shows an injection pattern in which low penetration injection P5 is executed in the AFTER region that is retarded from the after injection P3. In the low penetration injection P5, the injection amount is also smaller than the injections P1, P2, and P3 of the basic injection pattern. The injection pattern of FIG. 10C is employed when the ignition quality determination unit 75 determines the high ignition quality. The following conditions will lead to the high ignition quality, for example, when the engine rotation speed is high, the engine load is high, the engine water temperature is high, the outside air temperature is high, the air pressure is high, and the EGR amount is small. Under such high ignition quality conditions, while the ignition quality is not a problem, the use of the PILOT region will raise the problem of the above-mentioned premature ignition, and thus the AFTER region is used.

Figure 10D:
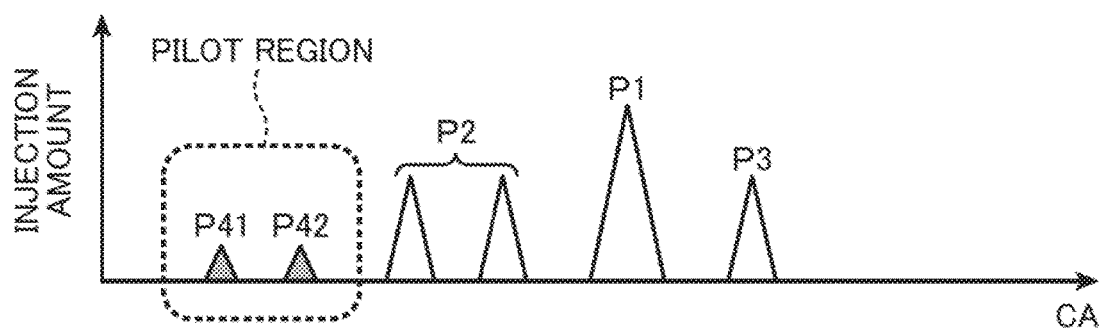

FIG. 10D shows an injection pattern in which the low penetration injection P4 is split and executed twice, that is, low penetration injections P41 and P42 are executed in the PILOT region. The spray penetration is determined by the injection pressure and the injection amount, as previously shown in FIG. 9B. Here, since the injection pressure is generally set by the operating state of the engine body 1 (engine load and rotation speed), there may be a case where the injection amount required for the low penetration injection cannot be secured by one injection with the set injection pressure. In such a case, the required injection amount can be secured by splitting the low penetration injection P4 into multiple times and executing the low penetration injections P41 and P42.

Figure 11:
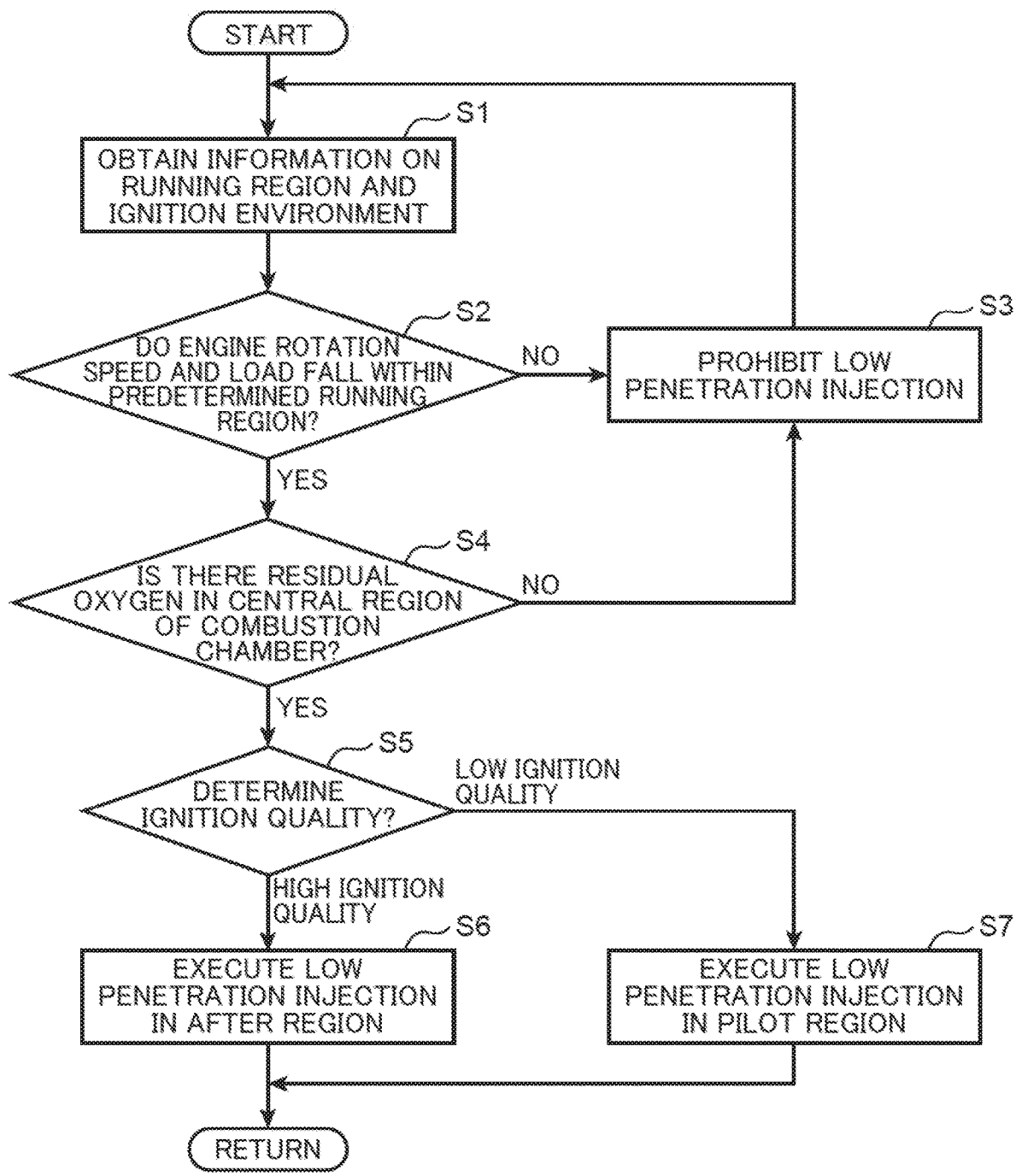
FIG. 11 is a flowchart showing low penetration injection control according to the first embodiment.

FIG. 11 is a flowchart showing low penetration injection control according to the first embodiment. The fuel injection control unit 71 of the processor 70 (FIG. 5) obtains information on a running region of the vehicle (operating state of the engine body 1) and ignition environment information that affects the ignition quality in the combustion chamber 6 from the sensors SN1 to SN12 shown in FIG. 5 and other sensors (step S1).

Subsequently, the operating state determination unit 73 determines whether the engine rotation speed detected by the crank angle sensor SN1 and the engine load detected by the accelerator opening sensor SN10 fall within a range of a predetermined running region (operating state) determined in advance (step S2). The predetermined running region is a running region in which the oxygen residual feasible region G2 shown in FIG. 7B is formed. For example, a case where the spray penetration of the main injection P1 or the pilot injection P2 is larger than a predetermined setting amount is exemplified. The predetermined setting amount is spray penetration that makes the injection amount such that air cannot remain in the radial central region of the combustion chamber 6, and generally corresponds to a high-load, high-rotation speed running region.

When the engine rotation speed and the engine load do not fall within the predetermined running region (NO in step S2), the operating state determination unit 73 determines that the engine body 1 is not in the operation mode for executing the low penetration injection. In this case, the fuel injection control unit 71 prohibits the low penetration injection (step S3). This is because when the low penetration injection is executed in such a running region, the air-fuel mixture becomes rich and the combustibility and fuel efficiency are deteriorated.

On the other hand, when the engine rotation speed and the engine load fall within the predetermined running region (YES in step S2), the oxygen residual feasible region G2 is formed in the radial central region of the combustion chamber 6. In this case, the residual oxygen amount determination unit 74 determines whether an oxygen amount equal to or greater than a predetermined value remains in the oxygen residual feasible region G2 (step S4). This determination is executed based on the detected value of the exhaust $O_2$ sensor SN8 or model calculation as described above. When the oxygen amount having the predetermined value or more does not remain in the oxygen residual feasible region G2 (NO in step S4), the fuel injection control unit 71 prohibits the low penetration injection because there is no oxygen to be used by executing the low penetration injection in the first place (step S3).

On the other hand, when the residual oxygen amount determination unit 74 determines that the oxygen amount of the predetermined value or more remains in the radial central region (YES in step S4), the engine body 1 is in a mode to execute the low penetration injection. In this case, the ignition quality determination unit 75 determines the ignition quality of the air-fuel mixture in the combustion chamber 6 with reference to the above-described conditions (step S5).

When the ignition quality determination unit 75 determines "high ignition quality" in step S5, the injection pattern setting unit 77 sets the injection pattern for executing the low penetration injection in the AFTER region (step S6). For example, the injection pattern including the low penetration injection P5 shown in FIG. 10C is set. On the other hand, when the ignition quality determination unit 75 determines "low ignition quality" in step S5, the injection pattern setting unit 77 sets the injection pattern for executing the low penetration injection in the PILOT region (step S7). For example, as shown in FIG. 10B, the injection pattern including the low penetration injection P4 or the injection pattern including the split low penetration injections P41 and P42 is set.

Second Embodiment

Next, a second embodiment of low penetration injection control will be described. The second embodiment shows an example of determining operation modes in accordance with injection pressure of an injector 15 determined in accordance with an operating state, defining control divisions (injection pattern) of low penetration injection in accordance with each operation mode, and executing timing correction of the low penetration injection in accordance with ignition quality and residual oxygen amount.

<Description of Control Divisions>

FIG. 12 is a diagram showing control divisions in low penetration injection control according to a second embodiment. In FIG. 12, a horizontal axis is fuel injection pressure of the injector 15, and shows set maximum injection pressure FPmax and set minimum injection pressure FPmin. A vertical axis is a fuel injection amount injected from the injector 15 (low penetration injection amount). A slant line H2 in FIG. 12 is a control target line for setting spray penetration of the low penetration injection at a target line H1 (FIG. 9). The injection pressure is set in accordance with the operating state of an engine body 1. Therefore, in order to spray the low penetration injection to the target line H1, the injection amount is adjusted in accordance with the set injection pressure. That is, the low penetration injection control of the present embodiment implements the spray penetration of the target line H1 by receiving injection pressure data as an existing value and setting the injection amount in accordance with the injection pressure. The control target line H2 represents such an injection amount setting line.

Roughly speaking, in regions where the injection pressure is relatively high, the low penetration injection is executed using a PILOT region, and in regions where the injection pressure is relatively low, the low penetration injection is executed using an AFTER region. The reason why the control is roughly divided in this way is as follows. First, characteristics of a diesel engine that as the injection pressure decreases, a particle size of spray particles increases and soot is more likely to be generated are taken into consideration. To inhibit soot, it is preferable to inject fuel in the AFTER region and burn the soot again. Therefore, in the low injection pressure region, the low penetration injection using the AFTER region is preferable.

When using the PILOT region, it is necessary to set an upper limit and a lower limit for the injection amount relatively strictly, and there is a circumstance that the region of low injection pressure cannot be used naturally. According to the control target line H2, when the injection pressure increases, the injection amount decreases, and conversely, when the injection pressure decreases, the injection amount increases. When the PILOT region is used, if the injection amount is too large, the radial central region becomes too rich, resulting in premature ignition, which may cause a change in an intended heat generation pattern (upper limit). For this reason, the PILOT region needs to be used in the region of high injection pressure. Furthermore, when the PILOT region is used, if the injection amount is too small, a problem that the radial central region is not ignited also occurs (lower limit).

In contrast, in the AFTER region, the upper and lower limits for the injection amount are relatively loose. That is, in the AFTER region, since combustion has already started and there is a heat source, consideration is not necessary for the ignition quality, which is a major problem in the PILOT region. However, if the injection amount is too small, a function of giving heat again by the injection in the AFTER region to oxidize soot tends to deteriorate (lower limit). Meanwhile, if the injection amount is excessive for the oxygen amount remaining in the radial central region, soot is newly generated (upper limit).

In terms of fuel efficiency, it is more advantageous to use the PILOT region. The injection in the AFTER region, which is executed after combustion of the main injection, contributes to torque generation, but thermal efficiency is poor and fuel consumption loss increases. The fuel injected in the PILOT region is burned in good thermal efficiency and contributes to torque generation. Therefore, if priority is given to fuel efficiency, it is preferable to use the PILOT region as much as possible. However, to achieve penetration to the target line H1 that is set to use the whole radial central region of the combustion chamber 6, using the PILOT region for a region of low injection pressure that requires a large amount of injection will cause a problem of premature ignition. Therefore, in the region of low injection pressure, the AFTER region, which is also advantageous in terms of soot inhibition, is used. As described above, the PILOT region is used in the high injection pressure region, and the AFTER region is used in the low injection pressure region.

Next, further divisions of the above-mentioned PILOT region and the AFTER region will be described. As shown in FIG. 12, the PILOT region is divided into a first region on a high injection pressure side where split injection is executed as shown in FIG. 10D, and a second region on a low injection pressure side where a single injection is executed as shown in FIG. 10B. The AFTER region is also divided into a third region on the high injection pressure side where split injection is executed, and a fourth region on the low injection pressure side where a single injection is executed.

The division between the single injection and the split injection depends on whether it is possible to secure the injection amount required to burn all oxygen in the oxygen residual feasible region G2 generated in the radial central region of the combustion chamber 6 in the injection along the control target line H2. In the regions where the injection pressure is high (first region, third region), the injection amount per one injection is small (if the injection amount is large, the injection will exceed the target line H1). Therefore, two or more injections are executed to ensure the required injection amount. On the other hand, in the regions where the injection pressure is low, the injection amount per one injection is relatively large, and thus the required injection amount can be secured by one injection.

The first region is a "PILOT split" region where the split low penetration injection is executed multiple times in the PILOT region. The second region is a "PILOT single" region where the single low penetration injection is executed in the PILOT region. The third region is an "AFTER split" region where the split low penetration injection is executed multiple times in the AFTER region. The fourth region is an "AFTER single" region where the single low penetration injection is executed in the AFTER region. FIG. 12 shows first, second, third, fourth, and fifth lines L1, L2, L3, L4, and L5 indicating the upper limit or lower limit of these divisions. The fuel injection amount has a relationship of L1<L2<L3<L4<L5.

The first line L1 having the smallest injection amount is a lower limit line for securing the injection amount that prevents ignition delay in the oxygen residual feasible region G2 in the PILOT split injection of the first region. If the injection amount per one injection decreases further, the required injection amount cannot be secured even by split injection, and as a result, combustion does not occur in the oxygen residual feasible region G2 or the timing of combustion start is delayed. That is, the first line L1 is a line that is set from a viewpoint of providing the minimum amount of heat that can cause combustion using oxygen in the region G2. Note that the first line L1 is also an injection amount at which the control target line H2 and the set maximum injection pressure FPmax intersect. Actually the first line L1 is also a line beyond which the injection amount cannot be reduced.

The second line L2 is a lower limit line for securing the injection amount that prevents ignition delay in the oxygen residual feasible region G2 in the PILOT single injection of the second region. If the injection amount per one injection is smaller than the second line L2, a single injection cannot secure the required injection amount, and split injection is required (first region). Note that it is also considered to use split injection in the second region and to secure the required injection amount with the total injection amount of the split injection. However, in this case, the injection amount per one injection needs to be set at the control target line H2 or less to prevent excessive injection amount, which is not preferable because the penetration does not reach the target line H1.

The third line L3 is an upper limit line that limits the injection amount so as not to cause premature ignition in the oxygen residual feasible region G2. If the injection amount per one injection becomes larger than the third line L3, the heat amount given to the oxygen residual feasible region G2 will be excessive, and ignition will occur earlier than originally planned combustion timing. The third line L3 is also the usage upper limit of the PILOT region. Note that the third line L3 is consequently the lower limit of the AFTER split injection of the third region, but this is not the functional lower limit of the AFTER split injection. As described above, in view of the fuel consumption loss, it is advantageous to use the PILOT region, and thus the PILOT region is applied with priority. The third line L3 is the lower limit in terms of compensating, with the AFTER region, the injection amount region that cannot be covered with the PILOT region due to the premature ignition problem.

The fourth line L4 is a lower limit line for securing the injection amount that causes a function of oxidizing soot to be performed in the AFTER single injection of the fourth region. If the injection amount per one injection is smaller than the fourth line L4, the injection amount for sufficiently oxidizing soot cannot be secured by the single injection, and split injection is required (third region). Meanwhile, the fifth line L5 is an upper limit line that limits the injection amount to prevent the oxygen residual feasible region G2 from becoming excessively rich in the AFTER single injection of the fourth region. If the injection amount per one injection is larger than the fifth line L5, a heat amount that is equal to or greater than the oxygen amount present in the oxygen remaining probability region G2 is given, and new soot can be generated.

<Correction of Injection Pattern>

As described above, in the low penetration injection, the injection patterns are used in accordance with the division of the first to fourth regions. However, it is preferable not to fix but to correct the divisions (first to fifth lines L1 to L5) and the injection timing in accordance with the operating state. The ignition quality of the air-fuel mixture in the combustion chamber 6 and appearance of soot mainly affect the divisions and injection timing.

FIG. 13 is a tabular diagram showing factors affecting ignition quality of an air-fuel mixture and generation of soot. First, the ignition quality is affected by the outside air temperature, the air pressure (altitude of the place of running), the engine rotation speed, the load, the water temperature, and other factors. When the outside air temperature is high, the air pressure is high, the engine rotation speed is high, the engine load is high, and the engine water temperature is high, then the air-fuel mixture has high ignition quality. In an opposite case, the air-fuel mixture has low ignition quality. Also, when the EGR amount is small or the turbocharging pressure is high, the air-fuel mixture has high ignition quality. Meanwhile, when the EGR amount is large and the turbocharging pressure is low, such as when a large amount of EGR gas is introduced into the combustion chamber 6 at a stretch, or when turbocharging temporarily fails to catch up, then the air-fuel mixture has low ignition quality.

Regarding generation of soot, first, the injection pressure of the injector 15 is a problem. As described above, when the injection pressure is low, the spray particle size of the fuel is large, which makes it easy to generate soot. Also, when the outside air temperature is high, the engine rotation speed is high, the engine load is high, and the engine water temperature is high, then the ignition quality improves, leading to a tendency that soot is likely to be generated. Furthermore, when an exhaust oxygen amount is large, that is, when a large amount of oxygen is exhausted from the combustion chamber 6, a large amount of oxygen is present, leading to a tendency that soot is unlikely to be generated.

The ignition quality affects the settings of the second line L2 and the third line L3 shown in FIG. 12. In a case of high ignition quality, it is possible to secure the ignition quality with less injection amount. Therefore, it is possible to set the second line L2 that is set from a viewpoint of preventing ignition delay at a lower injection amount level. That is, the lower limit of the second region can be extended. Meanwhile, the third line L3 needs to be set at a lower injection amount level because premature ignition tends to be likely to occur. That is, in the case of high ignition quality, it is necessary to extend the lower limit of the third region to extend the range of using the AFTER region. Also, it is preferable to set the injection timing with a tendency to be retarded from a viewpoint of inhibiting premature ignition.

In contrast, in a case of low ignition quality, it is preferable to set the second line L2 at a higher injection amount level in order to secure the ignition quality. Meanwhile, the third line L3 can be set at a higher injection amount level because premature ignition tends to be unlikely to occur in the case of low ignition quality. That is, it is possible to extend the range of using the PILOT region (second region) that is advantageous in terms of the fuel consumption loss. Also, in order to increase a mixing degree of fuel and air by the low penetration injection and to improve the ignition quality, injection timing is preferably set with a tendency to be advanced.

In this way, in the present embodiment, the timing of the low penetration injection is corrected in accordance with the ignition quality of the air-fuel mixture (fuel). This solves problems of premature ignition, generation of soot (high ignition quality), and ignition delay (low ignition quality), and implements good diesel combustion. For example, when the content of EGR gas is larger than a predetermined amount, a proportion of inert gas in the combustion chamber 6 increases, and the ignition quality naturally deteriorates. In this case, the timing of the low penetration injection is advanced. This advanced angle, which can increase the mixing degree of fuel and air, can prevent the occurrence of ignition delay.

The generation of soot affects the setting of injection timing. In the case of high ignition quality where soot is likely to be generated, it is preferable to retard the injection timing as much as possible to create an environment that is advantageous for burning soot. That is, it is preferable to give priority to elimination of soot over deterioration of the fuel consumption loss. Meanwhile, since soot is unlikely to be generated in the environment with a large exhaust oxygen amount, it is preferable to advance the injection timing as much as possible to inhibit the fuel consumption loss.

<Specific Examples of Injection Patterns>

FIGS. 14A to 14E and FIGS. 15A to 15D are time charts schematically showing nine injection modes of the low penetration injection according to the second embodiment. Here, as shown in FIG. 10A, examples are shown in which a main injection P1, a pilot injection P2 (first and second pilot injections P21 and P22), and an after injection P3 are executed as basic injection patterns. In addition to these injections P1 to P3, the low penetration injection P4 is executed.

FIG. 14A is an injection pattern called "PILOT split-A", which is a pattern employed as a basic injection pattern for the first region of FIG. 12. In the PILOT split-A, the low penetration injection P4 is executed in the PILOT region preceding the injections P1 to P3 of the basic injection pattern. The low penetration injection P4 includes a first injection P41 that is executed at a predetermined crank angle CA11 and a second injection P42 that is executed on a retarded side at a predetermined interval t11 from the first injection P41. The injection amounts of the first injection P41 and the second injection P42 are set at an injection amount Fa along the control target line H2.

FIG. 14B is an injection pattern called "PILOT split-B", which is an injection pattern in which the low penetration injection P4 is executed at timing advanced from the PILOT split-A. The low penetration injection P4 of the PILOT split-B is a split injection similar to the PILOT split-A, but the first injection P41 is executed at a crank angle CA12 that is advanced from the crank angle CA11. Then, the second injection P42 is executed on the retarded side at an interval t12 shorter than the interval t11. By advancing the injection timing of the first injection P41, it is possible to gain time from injection to ignition and to improve the ignition quality. Also, by setting the short interval t12 between the first and second injections P41 and P42, a rich zone is formed in which the injection fuel of the first injection P41 and the injection fuel of the second injection P42 overlap, thereby improving the ignition quality.

FIG. 14C is an injection pattern called "PILOT single-A", which is a pattern employed as a basic injection pattern for the second region. In the PILOT single-A, the low penetration injection P4 including a single injection is executed at a predetermined crank angle CA2 in the PILOT region. The injection amount of the low penetration injection P4 is set at an injection amount Fb along the control target line H2. That is, the injection amount Fb is larger than the injection amount Fa per one split injection.

FIG. 14D is an injection pattern called "PILOT single-B", which is an injection pattern in which the single low penetration injection P4 is executed at timing retarded from the PILOT single-A by ΔCA1. Retardation of ΔCA 1 can inhibit premature ignition. In contrast, FIG. 14E is an injection pattern called "PILOT single-C", which is an injection pattern in which the single low penetration injection P4 is executed at timing advanced from the PILOT single-A by ΔCA2. Advancement of ΔCA2 can improve the ignition quality as with PILOT split-B.

Figure 15A:
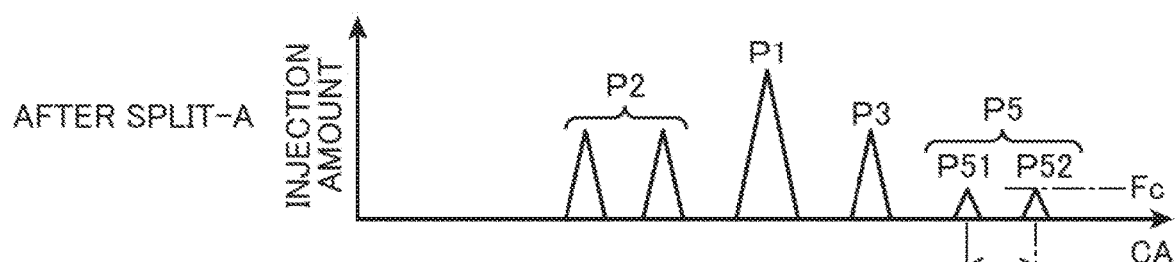
FIGS. 15A to 15D are time charts showing the mode of the low penetration injection according to the second embodiment.

FIG. 15A is an injection pattern called "AFTER split-A", which is a pattern employed as a basic injection pattern for the third region. In the AFTER split-A, the low penetration injection P5 is executed in the AFTER region after execution of the injections P1 to P3 of the basic injection pattern. The low penetration injection P5 includes a first injection P51 that is executed at a predetermined crank angle CA31 and a second injection P52 that is executed on a retarded side at a predetermined interval t21 from the first injection P51. The injection amounts of the first injection P51 and the second injection P52 are set at an injection amount Fc along the control target line H2.

Figure 15B:
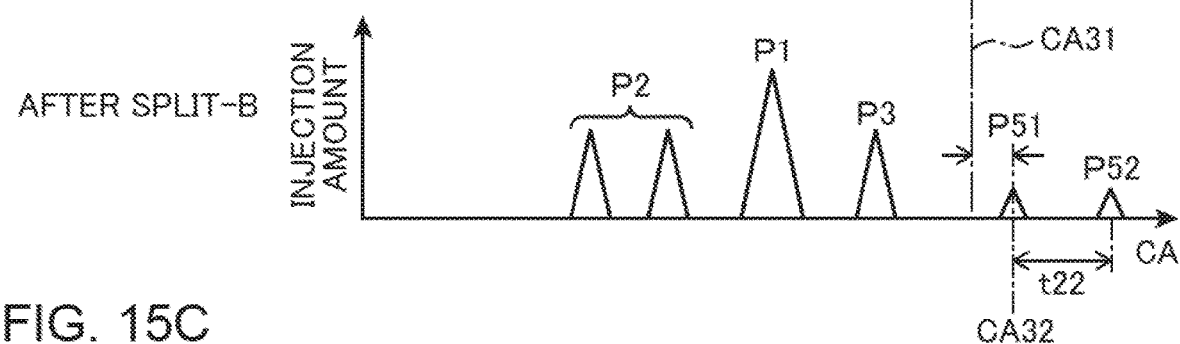

FIG. 15B is an injection pattern called "AFTER split-B", which is an injection pattern in which the low penetration injection P5 is executed at timing retarded from the AFTER split-A. The low penetration injection P5 of the AFTER split-B is a split injection similar to the AFTER split-A, but the first injection P51 is executed at a crank angle CA32 retarded from the crank angle CA31. Then, the second injection P52 is executed on the retarded side at an interval t22 longer than the interval t21. By retarding the injection timing of the first injection P51, it is advantageous for soot oxidation and combustion, and it is possible to further inhibit the generation of soot. Also, setting the long interval t22 between the first and second injections P51 and P52 contributes to the inhibition of soot.

Figure 15C:
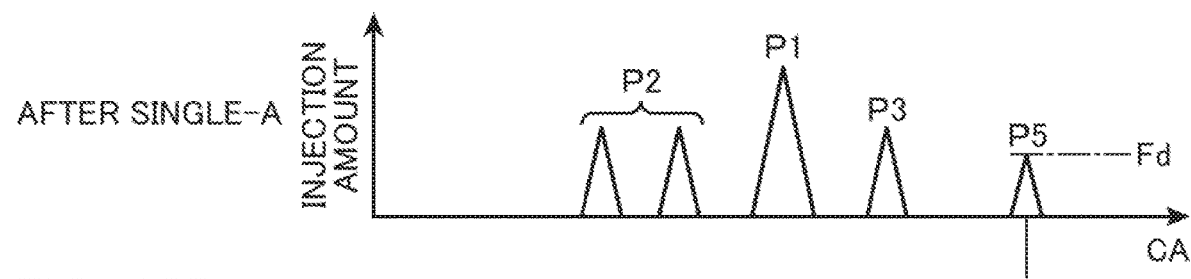

FIG. 15C is an injection pattern called "AFTER single-A", which is a pattern employed as a basic injection pattern for the fourth region. In the AFTER single-A, the low penetration injection P5 including a single injection is executed at a predetermined crank angle CA4 in the AFTER region. The injection amount of the low penetration injection P5 is set at an injection amount Fd along the control target line H2. That is, the injection amount Fd is larger than the injection amount Fc per one split injection.

Figure 15D:
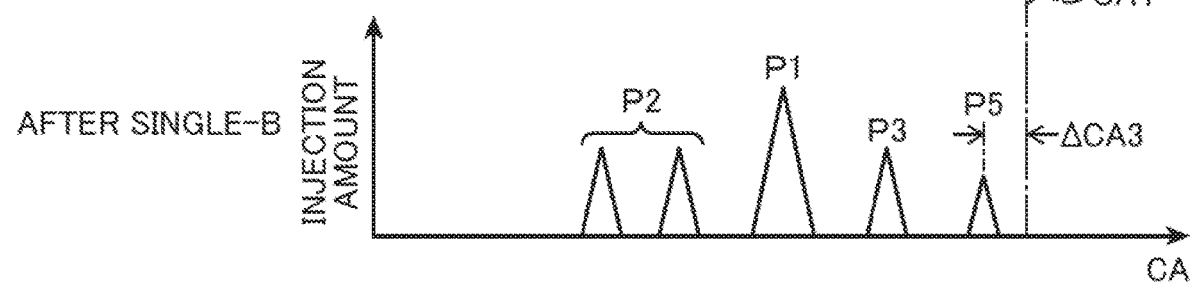

FIG. 15D is an injection pattern called "AFTER single-B", and is an injection pattern in which the single low penetration injection P5 is executed at timing advanced from the AFTER single-A by ΔCA3. Advancement of ΔCA3 can reduce the fuel consumption loss.

<Use of Injection Patterns>

In the present embodiment, the nine injection patterns described above are used as follows in the first to fourth regions shown in FIG. 12.

(1) First Region

When the factor affecting the ignition quality (FIG. 13) is a center region, the PILOT split-A pattern of FIG. 14A is used. The center region means that conditions such as the outside air temperature, air pressure, engine rotation speed, engine load, engine water temperature, EGR amount, and turbocharging pressure are within a predetermined range and are not too high or too low. Meanwhile, under the condition of high ignition quality, the PILOT single-B pattern of FIG. 14D is used. This is because the injection amount that defines the second line L2 decreases as the ignition quality improves. The injection timing of the low penetration injection P4 is set at timing retarded from at least the first injection P41 to inhibit premature ignition. Meanwhile, under the condition of low ignition quality, the PILOT split-B pattern of FIG. 14B is used. That is, advancement of the injection timing of the first injection P41, and shortening of the interval between the first and second injections P41 and P42 improve the ignition quality.

(2) Second Region

When the factor affecting the ignition quality is the center region, the PILOT single-A pattern of FIG. 14C is used. Meanwhile, under the condition of high ignition quality, the AFTER split-B pattern of FIG. 15B is used. This is because it is necessary to reduce the injection amount defining the third line L3 (to use the AFTER region) in order to avoid premature ignition. In addition, better ignition quality leads to an environment where soot is likely to be generated. However, employment of the AFTER split-B in which the low penetration injection (first and second injections P51 and P52) is executed at relatively late timing can inhibit the generation of soot. Meanwhile, under the condition of low ignition quality, the PILOT split-B pattern is used. This will improve the ignition quality.

(3) Third Region

When the factor affecting the ignition quality is the center region, the AFTER split-A pattern of FIG. 15A is used. Meanwhile, under the condition of high ignition quality, the AFTER split-B pattern is used. This can inhibit premature ignition and generation of soot. In contrast, under the condition of low ignition quality, the PILOT single-C pattern of FIG. 14E is used. This is because an environment where premature ignition is unlikely to occur can be obtained, and the injection amount that defines the third line L3 can be raised, enabling the use of the PILOT region with small fuel consumption loss. In addition, the execution of the advanced low penetration injection P4 can improve the ignition quality, which is another reason for employing the PILOT single-C. Furthermore, under the condition that the exhaust oxygen amount is larger than a predetermined threshold, the AFTER single-B pattern of FIG. 15D is used. This is because when combustion is executed in a state with plenty of oxygen, a function of oxidizing soot can be secured even if the injection amount defining the fourth line L4 is lowered (fourth region is extended). Also, this is because execution of the advanced low penetration injection P5 can reduce the fuel consumption loss.

(4) Fourth Region

This fourth region is no longer affected by the ignition quality. When the air temperature and the air pressure are in the center region, or when the engine load is high and the engine rotation speed is high, the AFTER single-A pattern of FIG. 15C is used. Meanwhile, filling efficiency, which is the absolute amount of fresh air contributing to the combustion, varies with the air temperature and the air pressure. At low air temperature and high air pressure, the filling efficiency increases, and the oxygen amount in the combustion chamber 6 increases. Conversely, at high air temperature and low air pressure, the oxygen amount decreases. Under the condition of low oxygen amount, the AFTER split-B pattern of FIG. 15B is used. This is because the low oxygen amount leads to an environment where soot is likely to be generated, and it is necessary to raise the injection amount that defines the fourth line L4. Also, the first and second injections P51 and P52 that are retarded and executed at long intervals can inhibit the generation of soot. Meanwhile, under the condition of high oxygen amount, the AFTER single-B pattern is used. This can reduce the fuel consumption loss.

<Control Flow of Low Penetration Injection>

Figure 16:
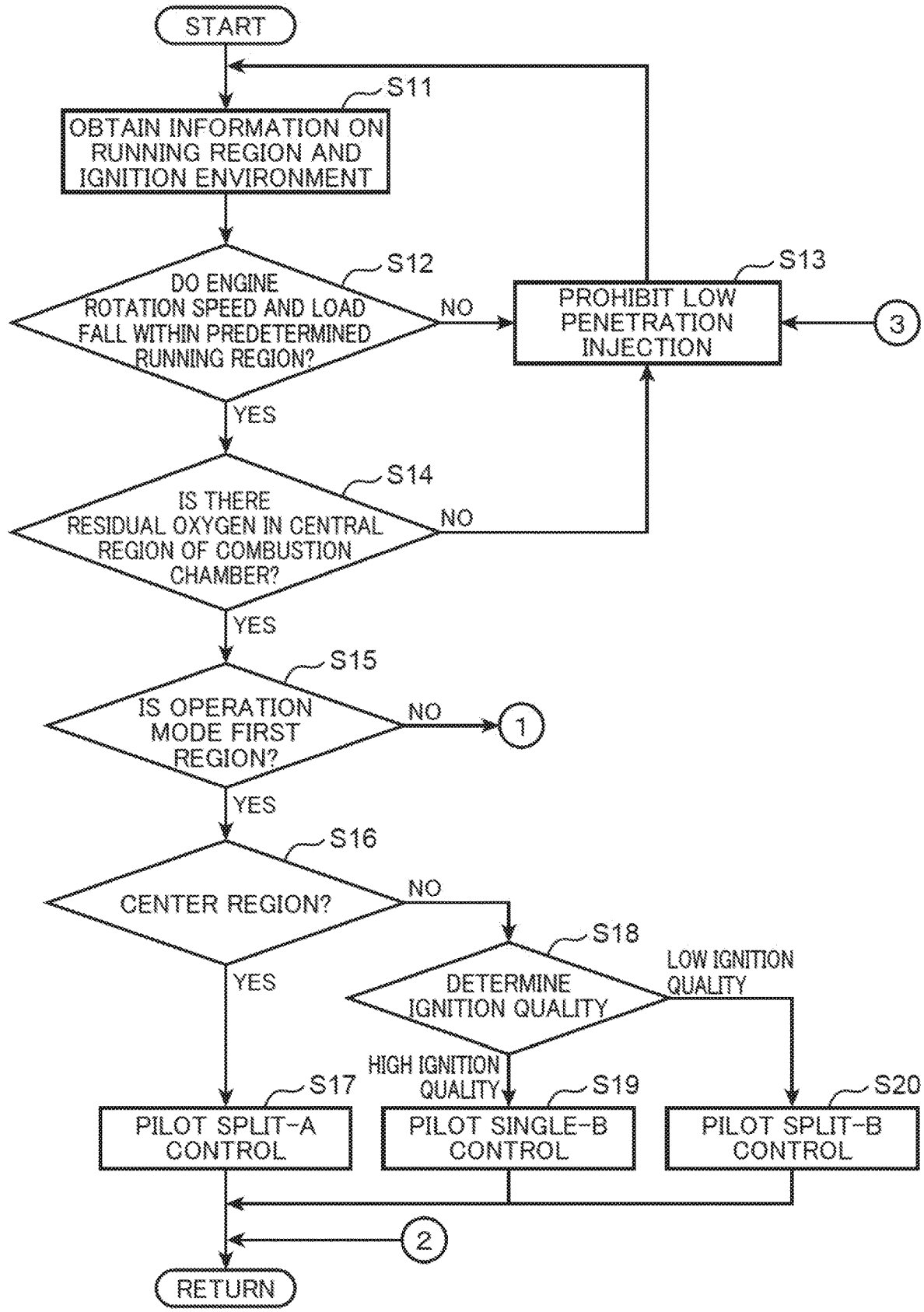
FIGS. 16 to 19 are flowcharts showing part of low penetration injection control according to the second embodiment.

Subsequently, the flow of low penetration injection control according to the second embodiment will be described with reference to flowcharts shown in FIGS. 16 to 19. With reference to FIG. 16, first, the process similar to the process shown in steps S1 to S4 of FIG. 11 is executed. That is, a fuel injection control unit 71 of a processor 70 (FIG. 5) obtains information on the running region of the vehicle and ignition environment information that affects the ignition quality in the combustion chamber 6 (step S11). Next, an operating state determination unit 73 determines whether the engine rotation speed and the engine load fall within a range of predetermined running region (high-load, high-rotation speed operating state) determined in advance (step S12).

When the engine rotation speed and the engine load do not fall within the predetermined running region (NO in step S12), the operating state determination unit 73 determines that the engine body 1 is not in the operation mode for executing the low penetration injection, and the fuel injection control unit 71 prohibits the low penetration injection (step S13). On the other hand, when the engine rotation speed and the engine load fall within the predetermined running region (YES in step S12), a residual oxygen amount determination unit 74 determines whether an oxygen amount equal to or greater than a predetermined value remains in the oxygen residual feasible region G2 (step S14). When the oxygen amount having the predetermined value or more does not remain in the oxygen residual feasible region G2 (NO in step S14), the fuel injection control unit 71 prohibits the low penetration injection (step S13).

On the other hand, when the residual oxygen amount determination unit 74 determines that the oxygen amount of the predetermined value or more remains in the radial central region (YES in step S14), the low penetration injection is executed. In this case, a mode determination unit 76 determines the current operation mode based on the setting value data of the injection pressure of the injector 15 (step S15). The operation mode to be determined is the first to fourth regions shown in FIG. 12. In step S15, it is determined whether the operation mode is an injection pressure that falls within the first region. Note that as the setting value data of injection pressure, detected values of an injection pressure sensor SN7 or calculated values calculated by the processor 70 in accordance with the engine load can be used.

When the current operation mode is the first region (YES in step S15), an injection pattern setting unit 77 determines whether the factor affecting the ignition quality (FIG. 13) falls within the center region described above (step S16). When the factor affecting the ignition quality falls within the center region (YES in step S16), the injection pattern setting unit 77 sets the PILOT split-A pattern of FIG. 14A as the injection pattern of the low penetration injection (step S17). Accordingly, in this cycle, the injector 15 injects the fuel in the PILOT split-A pattern. At this time, an injection timing setting unit 78 sets the injection timing that is set for the PILOT split-A.

On the other hand, when the factor affecting the ignition quality does not fall within the center region (NO in step S16), based on information detected by the various sensors SN1 to SN12, an ignition quality determination unit 75 determines whether the current operating environment is a high ignition quality environment where the air-fuel mixture is relatively likely to ignite in the combustion chamber 6 or a low ignition quality environment where the air-fuel mixture is relatively unlikely to ignite (step S18). When the ignition quality determination unit 75 determines "high ignition quality", the injection pattern setting unit 77 sets the PILOT single-B pattern of FIG. 14D as the injection pattern of the low penetration injection (step S19). On the other hand, when the ignition quality determination unit 75 determines "low ignition quality", the injection pattern setting unit 77 sets the PILOT split-B pattern of FIG. 14B as the injection pattern (step S20). Note that in steps S19 and S20, the injection timing setting unit 78 sets the injection timing of the low penetration injection to be retarded or advanced in accordance with the degree of ignition quality.

Figure 17:
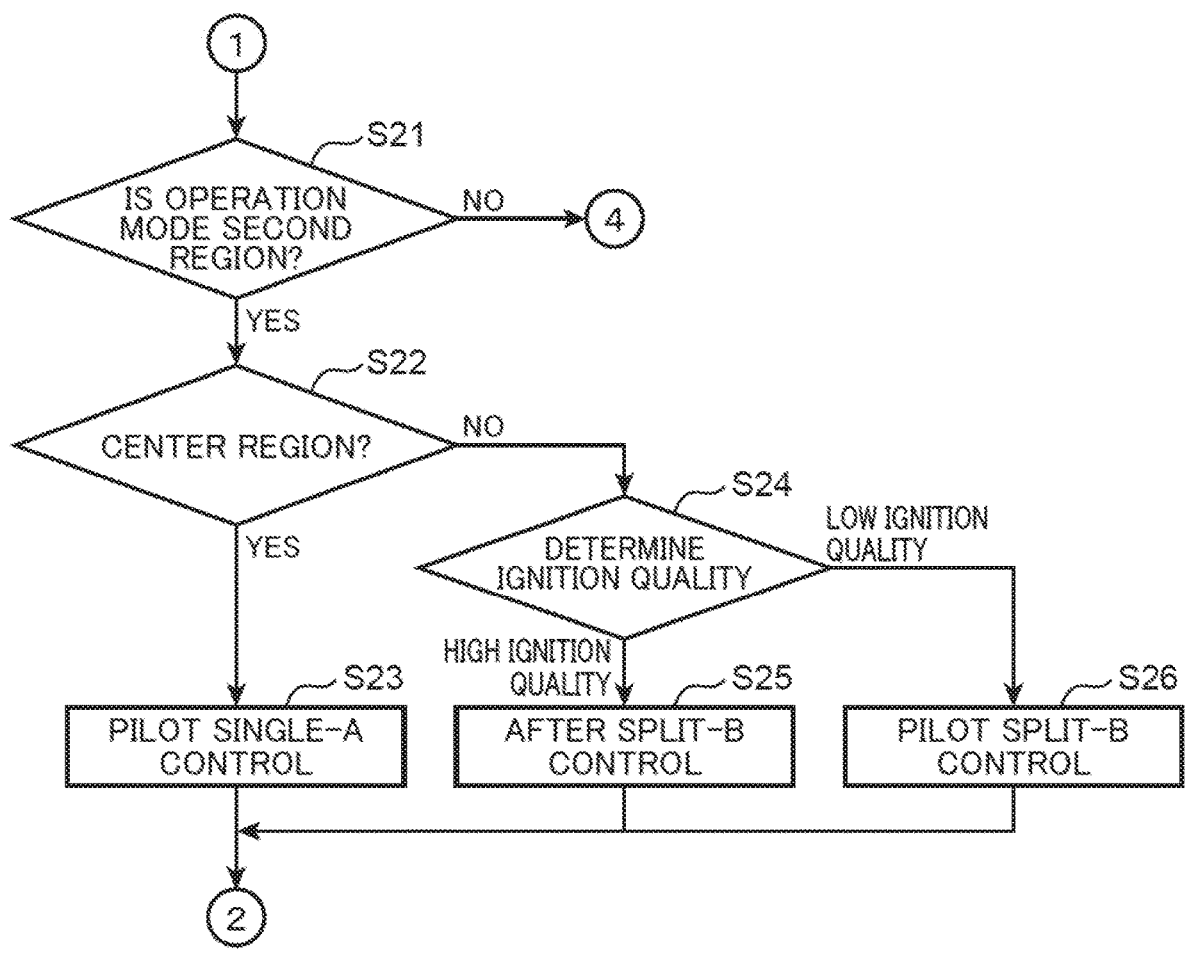

On the other hand, when the mode determination unit 76 determines in step S15 that the current operation mode is not the first region (NO in step S15), the process proceeds to the flow of FIG. 17. In this case, the mode determination unit 76 determines whether the current operation mode is the second region (step S21). When the current operation mode is the second region (YES in step S21), the injection pattern setting unit 77 determines whether the ignition quality factor falls within the center region, as in step S16 (step S22).

When the current operation mode falls within the center region (YES in step S22), the injection pattern setting unit 77 sets the PILOT single-A pattern of FIG. 14C as the injection pattern of the low penetration injection (step S23).

On the other hand, when the current operation mode does not fall within the center region (NO in step S22), as in step S18, the ignition quality determination unit 75 determines whether the current operating environment is the high ignition quality or the low ignition quality (step S24). When the ignition quality determination unit 75 determines "high ignition quality", the injection pattern setting unit 77 sets the AFTER split-B pattern of FIG. 15B as the injection pattern (step S25). On the other hand, when the ignition quality determination unit 75 determines "low ignition quality", the injection pattern setting unit 77 sets the PILOT split-B pattern of FIG. 14B as the injection pattern (step S26). Note that in steps S25 and S26, the injection timing setting unit 78 sets the injection timing of the low penetration injection to be retarded or advanced in accordance with the degree of ignition quality.

Figure 18:
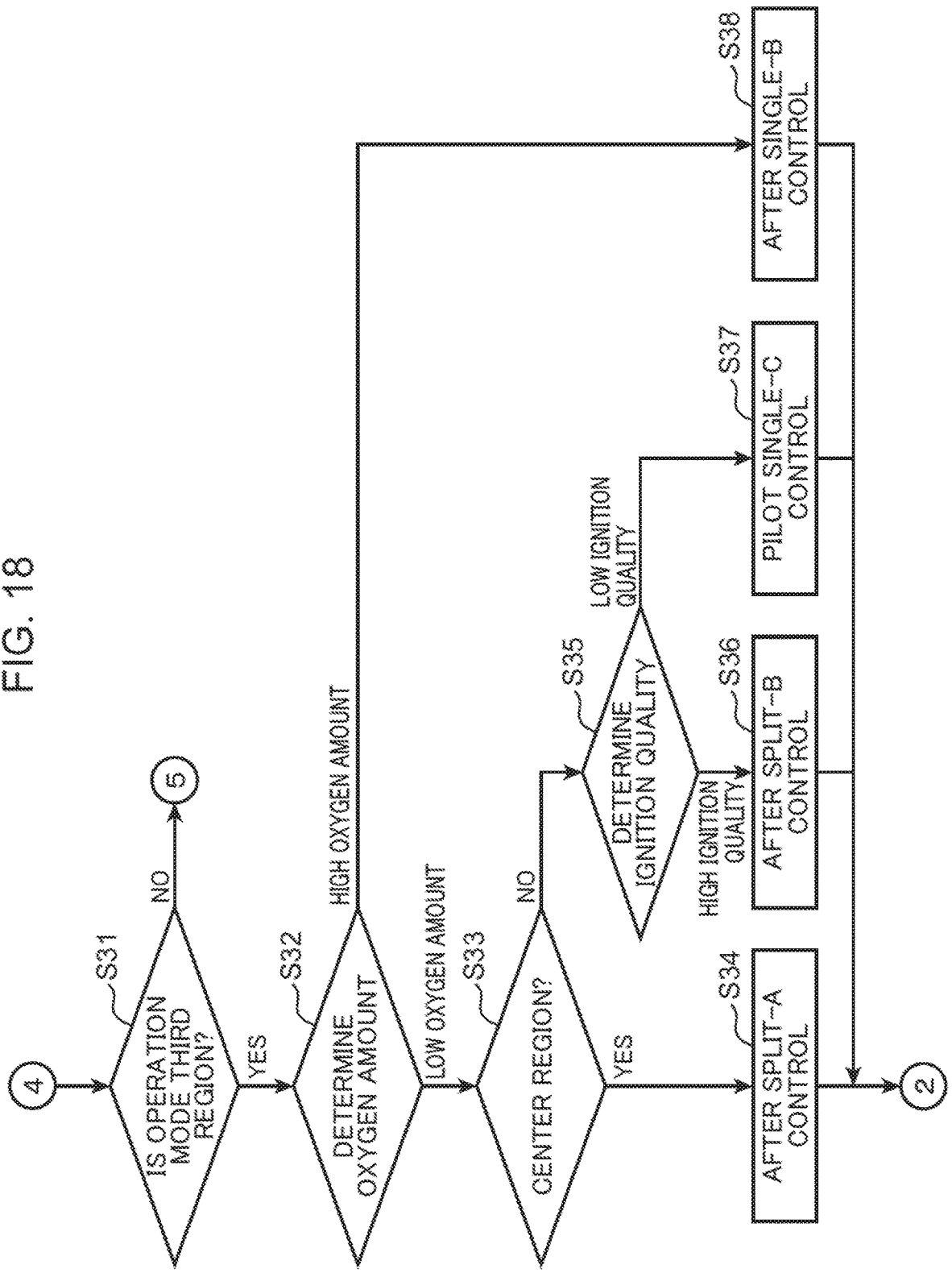

When the mode determination unit 76 determines in step S21 that the current operation mode is not the second region (NO in step S21), the process proceeds to the flow of FIG. 18. In this case, the mode determination unit 76 determines whether the current operation mode is the third region (step S31). When the current operation mode is the third region (YES in step S31), based on detected values of an exhaust $O_2$ sensor SN8, the residual oxygen amount determination unit 74 determines whether a state of "high oxygen amount" in which relatively large amount of residual oxygen is present in the combustion chamber 6, or a state of "low oxygen amount" in which relatively small amount of residual oxygen is present (step S32). At this stage, it has already been confirmed that oxygen remains in the radial central region of the combustion chamber 6 (oxygen residual feasible region G2) to which the low penetration injection is to be applied (step S14). The oxygen amount determination in step S32 is a process of determining how much oxygen remains in the oxygen residual feasible region G2.

When the residual oxygen amount determination unit 74 determines "low oxygen amount", as in step S16, the injection pattern setting unit 77 subsequently determines whether the ignition quality factor falls within the center region (step S33). When the ignition quality factor falls within the center region (YES in step S33), the injection pattern setting unit 77 sets the AFTER split-A pattern of FIG. 15A as the injection pattern of the low penetration injection (step S34). On the other hand, when the ignition quality factor does not fall within the center region (NO in step S33), as in step S18, the ignition quality determination unit 75 determines whether the current operating environment is the high ignition quality environment or the low ignition quality environment (step S35).

When the ignition quality determination unit 75 determines "high ignition quality", the injection pattern setting unit 77 sets the AFTER split-B pattern of FIG. 15B as the injection pattern (step S36). On the other hand, when the ignition quality determination unit 75 determines "low ignition quality", the injection pattern setting unit 77 sets the PILOT single-C pattern of FIG. 14E as the injection pattern (step S37). Note that in steps S36 and S37, the injection timing setting unit 78 sets the injection timing of the low penetration injection to be retarded or advanced in accordance with the degree of ignition quality.

In step S32, when the residual oxygen amount determination unit 74 determines "high oxygen amount", center region determination and ignition quality determination are not executed. In this case, the injection pattern setting unit 77 sets the AFTER single-B pattern of FIG. 15D as the injection pattern of the low penetration injection (step S38).

Figure 19:
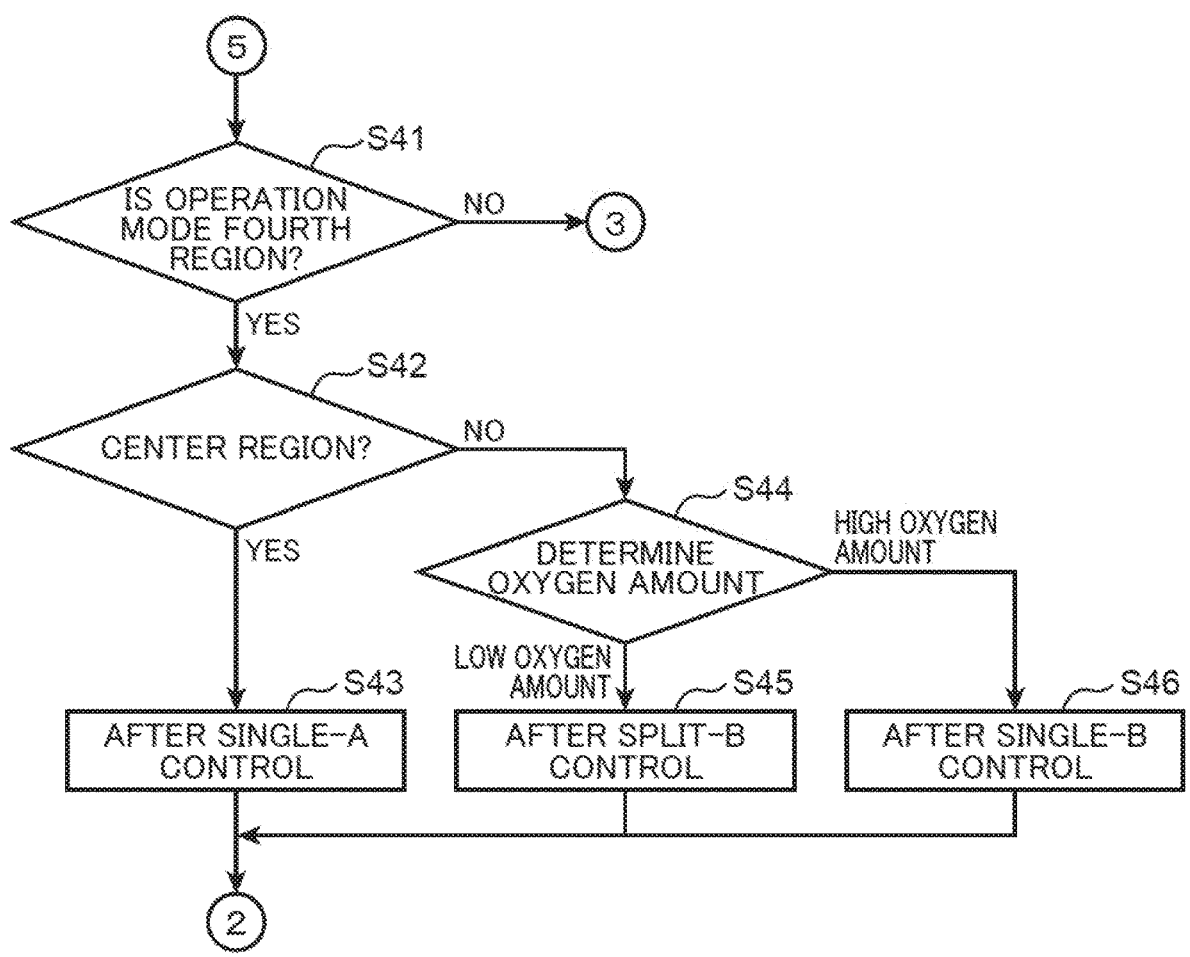

When the mode determination unit 76 determines in step S31 that the current operation mode is not the third region (NO in step S31), the process proceeds to the flow of FIG. 19. In this case, the mode determination unit 76 determines whether the current operation mode is the fourth region (step S41). When the current operation mode is the fourth region (YES in step S41), the injection pattern setting unit 77 determines whether the air temperature and the air pressure fall within the center region, or whether the engine load and the engine rotation speed fall within the high-load, high-rotation speed region (step S42). When the air temperature and the air pressure fall within the center region, or when the engine load and the engine rotation speed fall within the high-load, high-rotation speed region (YES in step S42), the injection pattern setting unit 77 sets the AFTER single-A pattern of FIG. 15C as the injection pattern of the low penetration injection (step S43).

On the other hand, when the air temperature and the air pressure do not fall within the center region, or when the engine load and the engine rotation speed do not fall within the high-load, high-rotation speed region (NO in step S42), as in step S32, the residual oxygen amount determination unit 74 subsequently determines whether the combustion chamber 6 is in a relatively high oxygen amount state or a low oxygen amount state (step S44). When the residual oxygen amount determination unit 74 determines "low oxygen amount", the injection pattern setting unit 77 sets the AFTER split-B pattern of FIG. 15B as the injection pattern (step S45). On the other hand, when the residual oxygen amount determination unit 74 determines "high oxygen amount", the injection pattern setting unit 77 sets the AFTER single-B pattern of FIG. 15D as the injection pattern (step S46).

Note that when it is determined in step S41 that the operation mode is not the fourth region (NO in step S41), the current operation mode is an irregular state that does not fall within any of the first to fourth regions. In this case, the fuel injection control unit 71 prohibits the low penetration injection (step S13).

[Operational Effects]

The fuel injection control system for a diesel engine according to the present embodiment described above produces the following effects. The bottom of the combustion chamber 6 of the diesel engine to be controlled is defined by the crown surface 50 including the first and second cavity portions 51 and 52 and the joint portion 53 connecting the first and second cavity portions 51 and 52. The fuel injection control unit 71 causes the injector 15 to execute the main injection P1 or the pilot injection P2 directed at the joint portion 53. This will develop a tendency that the in-cylinder flow of the air-fuel mixture is separated at the joint portion 53, the in-cylinder rotational flow becomes relatively weak, and the air near the central region of the radial direction B of the combustion chamber 6 is less likely to be drawn to the radial outer side.

However, in the fuel injection control system, in addition to the normal main injection P1 and the pilot injection P2, the fuel injection control unit 71 causes the injector 15 to execute the low penetration injection to inject fuel only into the radial central region in the combustion chamber 6, that is, to set the outer edge H of the central region (FIG. 8) where oxygen can remain due to weakening of the in-cylinder rotational flow as the penetration target. Therefore, the air-fuel mixture can be formed from the air remaining in the radial central region of the combustion chamber 6 and the spray fuel by the low penetration injection. Also, since the outer edge H is set as the penetration target, the air present in the radial central region can be fully used to form the air-fuel mixture. As a result, it is possible to effectively use the air in the combustion chamber 6 to form the homogeneous, thin air-fuel mixture, and to implement high-quality diesel combustion in which generation of soot and the like is inhibited.

Also, when the spray penetration of the main injection P1 or the pilot injection P2 is larger than the predetermined setting amount, the fuel injection control unit 71 prohibits the low penetration injection (steps S2 and S3 of FIG. 11, steps S12 and S13 of FIG. 16). The spray penetration of the main injection P1 or the pilot injection P2 is larger than the predetermined setting amount, for example, when the engine load is large, which is a case where the fuel injection amount in these injections is relatively large. In such a case, there will be no air remaining in the radial central region of the combustion chamber 6 (oxygen residual feasible region G2 is not generated). Therefore, by prohibiting the low penetration injection, it is possible to prevent the air-fuel mixture from becoming excessively rich.

Furthermore, the fuel injection control unit 71 prohibits the low penetration injection under the condition that the oxygen amount of the radial central region of the combustion chamber 6 is less than or equal to the predetermined value (steps S4 and S3 of FIG. 11, steps S14 and S13 of FIG. 16). Under the condition that the oxygen amount of the radial central region of the combustion chamber 6 is thin, even under the condition that the oxygen residual feasible region G2 is generated, there is no need to execute the low penetration injection in the first place. Under such a condition, the fuel injection control unit 71, which prohibits the low penetration injection, can prevent unnecessary fuel consumption.

Modifications

The embodiments of the present invention have been described above, but the present invention is not limited to these embodiments, and for example, the following modified embodiments can be employed.

(1) The above-described embodiments have shown examples in which the main injection P1, the pilot injection P2, and the after injection P3 are executed as the basic injection pattern (FIGS. 10, 14, 15). The basic injection pattern is required to include at least the main injection P1 and the pilot injection P2, and may omit the after injection P3. Also, the above-described embodiments have shown examples in which the pilot injection P2 is executed twice, first pilot injection P21 and second pilot injection P22. Instead, the pilot injection P2 may be a single injection or three or more injections. Furthermore, the above-described embodiments have shown examples in which the main injection P1 is an injection with the maximum energy (injection amount). However, according to another mode, the pilot injection P2 may have the maximum injection amount, and the pilot injection P2 may be directed at the joint portion 53.

(2) Regarding timing of the low penetration injection, the above-described embodiments have shown examples in which timing earlier than the pilot injection P2 (PILOT region) or timing later than the main injection P1 (AFTER region) is used in accordance with the operating state and environment. Instead, the low penetration injection may be executed in both the PILOT region and the AFTER region in consideration of functions in each region.

(3) When executing the low penetration injection by split injection, the above-described embodiments have shown examples of splitting the low penetration injection into two injections, but may split the low penetration injection into three or more injections. Furthermore, in the PILOT split-B control of FIG. 14B and the AFTER split-B control of FIG. 15B, the above-described embodiments have shown examples in which the interval of split injection is reduced and enlarged as compared with the injection control in the center region. Instead, the control may be executed without changing the interval.

Note that the above-described specific embodiments disclose a fuel injection control system for a diesel engine having the following configurations.

A fuel injection control system for a diesel engine according to one aspect of the present invention is a fuel injection control system for a diesel engine including: a combustion chamber of an engine, formed with a lower surface of a cylinder head, a cylinder, and a crown surface of a piston; a fuel injection valve configured to inject fuel into the combustion chamber; and a fuel injection control device including a processer and configured to control an operation of the fuel injection valve. The crown surface of the piston includes a cavity. The cavity includes: a first cavity portion disposed in a radial central region of the crown surface, the first cavity portion including a first bottom having a first depth in a cylinder axial direction; a second cavity portion disposed on an outer peripheral side of the first cavity portion in the crown surface, the second cavity portion including a second bottom having a depth shallower than the first depth in the cylinder axial direction; and a joint portion connecting the first cavity portion and the second cavity portion. The fuel injection valve is configured to inject the fuel toward the cavity and is disposed at or near a radial center of the combustion chamber. The fuel injection control device is configured to cause the fuel injection valve to execute at least: a main injection to inject the fuel at timing when the piston is positioned near a compression top dead center; a pilot injection to inject the fuel at timing earlier than the main injection; and a low penetration injection to inject the fuel at timing earlier than the pilot injection or timing later than the main injection. The fuel injection control device is configured to execute: a first injection control module to execute at least one of the main injection or the pilot injection at timing of injecting the fuel toward the joint portion; and a second injection control module to execute the low penetration injection to inject the fuel only into the radial central region of the combustion chamber.

With this fuel injection control system, part of the combustion chamber is formed with the crown surface including the first and second cavity portions, and the fuel injection of the main injection or the pilot injection is executed toward the joint portion. Therefore, there is a tendency that the in-cylinder flow of the air-fuel mixture is separated at the joint portion, the in-cylinder rotational flow becomes relatively weak, and the air near the radial central region of the combustion chamber is unlikely to be drawn into the radial outer side. However, with the above-described fuel injection control system, the low penetration injection is executed in addition to the normal main injection and the pilot injection. The low penetration injection is executed such that the fuel is injected only into the radial central region of the combustion chamber. Therefore, the air-fuel mixture can be formed with the air remaining in the radial central region of the combustion chamber and the spray fuel by the low penetration injection. As a result, it is possible to effectively use the air in the combustion chamber to form the homogeneous, thin air-fuel mixture, and to implement high-quality diesel combustion in which generation of soot and the like is inhibited.

In the fuel injection control system, the fuel injection control device preferably prohibits the low penetration injection when spray penetration of the main injection or the pilot injection is larger than a predetermined setting amount.

The spray penetration of the main injection or the pilot injection becomes larger than the predetermined setting amount, for example, in a case where the engine load is heavy, and in a case where the fuel injection amount in these injections is relatively large. In such cases, executing the low penetration injection tends to enrich the air-fuel mixture. Therefore, it is appropriate to prohibit the low penetration injection.

In the fuel injection control system, the fuel injection control device preferably prohibits the low penetration injection under a condition that an oxygen amount in the radial central region of the combustion chamber is equal to or less than a predetermined value.

Under the condition that the oxygen amount in the radial central region of the combustion chamber is thin, it is not necessary to execute the low penetration injection in the first place. The fuel injection control system, which prohibits the low penetration injection under such a condition, can prevent unnecessary fuel consumption.

In the fuel injection control system, the second injection control module preferably executes the low penetration injection to cause an outer edge of the radial central region of the combustion chamber to be a spray penetration.

This fuel injection control system sets the position of the outer edge of the radial central region of the combustion chamber as a target for the spray penetration. This makes it possible to make full use of the air present in the radial central region to form the air-fuel mixture, and as a result, to further inhibit generation of soot and the like.

In the fuel injection control system, the second injection control module preferably corrects the timing of the low penetration injection in accordance with ignition quality of the fuel.

Under an operating condition of good ignition quality, for example, there is a tendency for premature combustion and soot generation to be likely to occur. Meanwhile, under an operating condition of poor ignition quality, there is a tendency for an ignition delay to occur with respect to intended ignition timing. In view of these situations, by appropriately correcting the timing of the low penetration injection, good diesel combustion can be implemented.

In the fuel injection control system, preferably, the diesel engine includes an exhaust gas recirculation (EGR) device that mixes part of an exhaust gas with intake air, and the second injection control module advances the timing of the low penetration injection when a content of an EGR gas is larger than a predetermined amount.

When the content of the EGR gas is larger than the predetermined amount, a proportion of inert gas in the combustion chamber increases, and the ignition quality naturally deteriorates. In such a case, the fuel injection control system can advance the timing of the low penetration injection and increase the mixing degree of fuel and air. Therefore, the occurrence of ignition delay can be prevented.

In the fuel injection control system, preferably, the second injection control module estimates an oxygen residual feasible region that is generated in the radial central region of the combustion chamber based on injection pressure, injection amount, and injection timing of the main injection or the pilot injection by the first injection control module, and the second injection control module executes the low penetration injection to cause an outer edge of the oxygen residual feasible region to be a spray penetration.

This fuel injection control system estimates the oxygen residual feasible region where oxygen to be used remains from an injection control result by the first injection control unit, and executes the low penetration injection for the estimated oxygen residual feasible region. Therefore, combustion with effective use of residual oxygen in the combustion chamber can be implemented.

A fuel injection control system for a diesel engine according to another aspect of the present invention includes: a combustion chamber of an engine, formed with a lower surface of a cylinder head, a cylinder, and a crown surface of a piston; a fuel injection valve configured to inject fuel into the combustion chamber; and a fuel injection control device including a processer and configured to control an operation of the fuel injection valve. The crown surface of the piston includes a cavity. The cavity includes: a first cavity portion disposed in a radial central region of the crown surface, the first cavity portion including a first bottom having a first depth in a cylinder axial direction; a second cavity portion disposed on an outer peripheral side of the first cavity portion in the crown surface, the second cavity portion including a second bottom having a depth shallower than the first depth in the cylinder axial direction; and a joint portion connecting the first cavity portion and the second cavity portion. The fuel injection valve is configured to inject the fuel toward the cavity and is disposed at or near a radial center of the combustion chamber. The fuel injection control device is configured to cause the fuel injection valve to execute at least: a first injection to inject the fuel at timing when the piston is positioned near a compression top dead center; a second injection to inject the fuel at timing earlier than the first injection; and a third injection to inject the fuel at timing earlier than the second injection or timing later than the first injection. The fuel injection control device is configured to execute: a first injection control module to execute at least one of the first injection or the second injection at timing of injecting the fuel toward the joint portion; and a second injection control module to execute the third injection. The second injection control unit: estimates a rotational diameter of a rotational flow generated in the first cavity portion based on injection pressure, injection amount, and injection timing of the first injection or the second injection by the first injection control module; the rotational flow being an in-cylinder flow of an air-fuel mixture containing the injected fuel, estimates an oxygen residual feasible region generated in the radial central region of the combustion chamber based on the estimated rotational diameter; and executes the third injection to spray the fuel only into the estimated oxygen residual feasible region.

A fuel injection control method for a diesel engine according to still another aspect of the present invention is a fuel injection control method for a diesel engine, the diesel engine including: a combustion chamber formed with a lower surface of a cylinder head, a cylinder, and a crown surface of a piston; and a fuel injection valve configured to inject fuel into the combustion chamber. The crown surface of the piston of the diesel engine includes a cavity, the cavity includes: a first cavity portion disposed in a radial central region of the crown surface, the first cavity portion including a first bottom having a first depth in a cylinder axial direction; a second cavity portion disposed on an outer peripheral side of the first cavity portion in the crown surface, the second cavity portion including a second bottom having a depth shallower than the first depth in the cylinder axial direction; and a joint portion connecting the first cavity portion and the second cavity portion, the fuel injection valve is configured to inject the fuel toward the cavity and is disposed at or near a radial center of the combustion chamber. The fuel injection control method includes, at least: a first injection step in which the fuel injection valve injects the fuel at timing when the piston is positioned near a compression top dead center; a second injection step in which the fuel injection valve injects the fuel at timing earlier than the first injection; and a third injection step in which the fuel injection valve injects the fuel at timing earlier than the second injection or timing later than the first injection. The third injection step includes: a step of estimating a rotational diameter of a rotational flow generated in the first cavity portion based on injection pressure, injection amount, and injection timing of the first injection or the second injection; the rotational flow being an in-cylinder flow of an air-fuel mixture containing the injected fuel, a step of estimating an oxygen residual feasible region generated in the radial central region of the combustion chamber based on the estimated rotational diameter, and a step in which the fuel injection valve sprays the fuel only into the estimated oxygen residual feasible region.

The fuel injection control system and method execute the third injection so as to spray the fuel only into the oxygen residual feasible region generated in the radial central region of the combustion chamber. Therefore, the air-fuel mixture can be formed with the air remaining in the radial central region of the combustion chamber and the fuel sprayed by the third injection. As a result, it is possible to effectively use the air in the combustion chamber to form the homogeneous, thin air-fuel mixture, and to implement high-quality diesel combustion in which generation of soot and the like is inhibited.

In the fuel injection control system, the second injection control unit preferably executes the third injection with an outer edge of the estimated oxygen residual feasible region as a penetration target. Also, in the fuel injection control method, the fuel injection valve preferably sprays the fuel with the outer edge of the estimated oxygen residual feasible region as the penetration target in the third injection step. The device and method can implement combustion effectively using the residual oxygen in the combustion chamber.

The present invention described above can provide a fuel injection control system and a fuel injection control method for a diesel engine that can form a homogeneous, thin air-fuel mixture by effectively using air in a combustion chamber to inhibit generation of soot and the like as much as possible.

This application is based on Japanese Patent application No. 2018-122989 filed in Japan Patent Office on Jun. 28, 2018, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A fuel injection control system for a diesel engine, the fuel injection control system comprising:

a combustion chamber of an engine, formed with a lower surface of a cylinder head, a cylinder, and a crown surface of a piston;
a fuel injection valve configured to inject fuel into the combustion chamber; and
a fuel injection control device including a processor and configured to control an operation of the fuel injection valve; wherein
the crown surface of the piston includes a cavity,
the cavity includes:
  a first cavity portion disposed in a radial central region of the crown surface, the first cavity portion including a first bottom having a first depth in a cylinder axial direction;
  a second cavity portion disposed on an outer peripheral side of the first cavity portion in the crown surface, the second cavity portion including a second bottom having a depth shallower than the first depth in the cylinder axial direction; and
  a joint portion connecting the first cavity portion and the second cavity portion,
the fuel injection valve is configured to inject the fuel toward the cavity and is disposed at or near a radial center of the combustion chamber,
the fuel injection control device is configured to cause the fuel injection valve to execute at least: a main injection to inject the fuel at timing when the piston is positioned near a compression top dead center; a pilot injection to inject the fuel at timing earlier than the main injection; and a low penetration injection to inject the fuel at timing earlier than the pilot injection or timing later than the main injection,
the fuel injection control device is configured to execute:
  a first injection control module to execute at least one of the main injection or the pilot injection at timing of injecting the fuel toward the joint portion; and
  a second injection control module to execute the low penetration injection to inject the fuel only into the radial central region of the combustion chamber, and
an injection amount of the low penetration injection is smaller than an injection amount of the pilot injection and smaller than an injection amount of the main injection.

2. The fuel injection control system according to claim 1, wherein
the fuel injection control device prohibits the low penetration injection when spray penetration of the main injection or the pilot injection is larger than a predetermined setting amount.

3. The fuel injection control system according to claim 1, wherein
the fuel injection control device prohibits the low penetration injection under a condition that an oxygen amount in the radial central region of the combustion chamber is equal to or less than a predetermined value.

4. The fuel injection control system according to claim 1, wherein
the second injection control module executes the low penetration injection to cause an outer edge of the radial central region of the combustion chamber to be a spray penetration.

5. The fuel injection control system according to claim 1, wherein
the second injection control module corrects the timing of the low penetration injection in accordance with ignition quality of the fuel.

6. The fuel injection control system according to claim 5, wherein
the diesel engine includes an EGR device that mixes part of an exhaust gas with intake air, and
the second injection control module advances the timing of the low penetration injection when a content of an EGR gas is larger than a predetermined amount.

7. The fuel injection control system according to claim 1, wherein
the second injection control module estimates an oxygen residual feasible region that is generated in the radial central region of the combustion chamber based on injection pressure, injection amount, and injection timing of the main injection or the pilot injection by the first injection control module, and the second injection control module executes the low penetration injection to cause an outer edge of the oxygen residual feasible region to be a spray penetration.

8. A fuel injection control system for a diesel engine, the fuel injection control system comprising:
  a combustion chamber of an engine, formed with a lower surface of a cylinder head, a cylinder, and a crown surface of a piston;
  a fuel injection valve configured to inject fuel into the combustion chamber; and
  a fuel injection control device including a processor and configured to control an operation of the fuel injection valve; wherein
  the crown surface of the piston includes a cavity,
  the cavity includes:
  a first cavity portion disposed in a radial central region of the crown surface,
    the first cavity portion including a first bottom having a first depth in a cylinder axial direction;
    a second cavity portion disposed on an outer peripheral side of the first cavity portion in the crown surface, the second cavity portion including a second bottom having a depth shallower than the first depth in the cylinder axial direction; and
    a joint portion connecting the first cavity portion and the second cavity portion,
  the fuel injection valve is configured to inject the fuel toward the cavity and is disposed at or near a radial center of the combustion chamber,
  the fuel injection control device is configured to cause the fuel injection valve to execute at least: a first injection to inject the fuel at timing when the piston is positioned near a compression top dead center; a second injection to inject the fuel at timing earlier than the first injection; and a third injection to inject the fuel at timing earlier than the second injection or timing later than the first injection,
  the fuel injection control device is configured to execute:
    a first injection control module to execute at least one of the first injection or the second injection at timing of injecting the fuel toward the joint portion; and
    a second injection control module to execute the third injection,
  the second injection control module:
    estimates a rotational diameter of a rotational flow generated in the first cavity portion based on injection pressure, injection amount, and injection timing of the first injection or the second injection by the first injection control module, the rotational flow being an in-cylinder flow of an air-fuel mixture containing the injected fuel;

estimates an oxygen residual feasible region generated in the radial central region of the combustion chamber based on the estimated rotational diameter; and executes the third injection to spray the fuel only into the estimated oxygen residual feasible region, and an injection amount of the third injection is smaller than an injection amount of the second injection and smaller than an injection amount of the first injection.

9. The fuel injection control system according to claim 8, wherein the second injection control module executes the third injection with an outer edge of the estimated oxygen residual feasible region as a penetration target.

10. A fuel injection control method for a diesel engine, the diesel engine including: a combustion chamber formed with a lower surface of a cylinder head, a cylinder, and a crown surface of a piston; and a fuel injection valve configured to inject fuel into the combustion chamber, wherein the crown surface of the piston of the diesel engine includes a cavity, the cavity including: a first cavity portion disposed in a radial central region of the crown surface, the first cavity portion including a first bottom having a first depth in a cylinder axial direction; a second cavity portion disposed on an outer peripheral side of the first cavity portion in the crown surface, the second cavity portion including a second bottom having a depth shallower than the first depth in the cylinder axial direction; and a joint portion connecting the first cavity portion and the second cavity portion, the fuel injection valve is configured to inject the fuel toward the cavity and is disposed at or near a radial center of the combustion chamber, the fuel injection control method comprising:

a first injection step in which the fuel injection valve injects the fuel at timing when the piston is positioned near a compression top dead center;

a second injection step in which the fuel injection valve injects the fuel at timing earlier than the first injection; and a third injection step in which the fuel injection valve injects the fuel at timing earlier than the second injection step or timing later than the first injection step, wherein the third injection step includes:

a step of estimating a rotational diameter of a rotational flow generated in the first cavity portion based on injection pressure, injection amount, and injection timing of the first injection step or the second injection step; the rotational flow being an in-cylinder flow of an air-fuel mixture containing the injected fuel, a step of estimating an oxygen residual feasible region generated in the radial central region of the combustion chamber based on the estimated rotational diameter, and a step in which the fuel injection valve sprays the fuel only into the estimated oxygen residual feasible region, and an injection amount of the third injection step is smaller than an injection amount of the second injection step and smaller than an injection amount of the first injection step.

11. The fuel injection control method according to claim 10, wherein in the third injection step, the fuel injection valve sprays the fuel with an outer edge of the estimated oxygen residual feasible region as a penetration target.

* * * * *